United States Patent
Houser et al.

(10) Patent No.: US 8,366,179 B2
(45) Date of Patent: Feb. 5, 2013

(54) MOTORIZED VEHICLES WITH DEFLECTABLE COMPONENTS

(75) Inventors: Russell A. Houser, Livermore, CA (US); William D. Hare, Bethesda, MD (US)

(73) Assignee: Cardiovascular Technologies, Inc., Livermore, CA (US)

( * ) Notice: Subject to any disclaimer, the term of this patent is extended or adjusted under 35 U.S.C. 154(b) by 31 days.

(21) Appl. No.: 13/210,354

(22) Filed: Aug. 15, 2011

(65) Prior Publication Data

US 2012/0038184 A1    Feb. 16, 2012

Related U.S. Application Data

(63) Continuation of application No. 11/160,850, filed on Jul. 12, 2005, now abandoned, which is a continuation of application No. 10/050,944, filed on Jan. 22, 2002, now Pat. No. 6,916,035.

(60) Provisional application No. 60/263,418, filed on Jan. 23, 2001.

(51) Int. Cl.
   *B62D 35/00* (2006.01)
(52) U.S. Cl. .................. 296/180.2; 296/180.1
(58) Field of Classification Search .... 296/180.1–180.5; 244/213, 215
   See application file for complete search history.

(56) References Cited

U.S. PATENT DOCUMENTS

| | | |
|---|---|---|
| 4,071,264 A | 1/1978 | Legrand et al. |
| 4,345,374 A | 8/1982 | Jacobson |
| 4,347,663 A | 9/1982 | Ullmo |
| 4,439,920 A | 4/1984 | Nauheimer |
| 4,446,619 A | 5/1984 | Jacobson |
| 4,459,744 A | 7/1984 | Esnard |
| 4,461,079 A | 7/1984 | Ciaffone et al. |
| 4,502,216 A | 3/1985 | Furnari |
| 4,516,320 A | 5/1985 | Peleckis |
| 4,627,635 A | 12/1986 | Koleda |
| 4,642,892 A | 2/1987 | Ishida |
| 4,716,652 A | 1/1988 | Cataudella |
| 4,720,917 A | 1/1988 | Solow |
| 4,754,548 A | 7/1988 | Solow |
| 4,791,724 A | 12/1988 | Dumas |
| 4,800,649 A | 1/1989 | Cataudella |
| 4,845,846 A | 7/1989 | Sinka |
| 4,879,811 A | 11/1989 | Cooney |
| 4,903,405 A | 2/1990 | Halevy |
| 4,955,136 A | 9/1990 | Diaz-rivera |
| 5,002,300 A | 3/1991 | Pascal et al. |
| 5,092,618 A | 3/1992 | Mayr |
| 5,157,835 A | 10/1992 | Lazarchik et al. |
| 5,199,734 A | 4/1993 | Mayr |
| 5,208,982 A | 5/1993 | Ferruzza |
| 5,224,267 A | 7/1993 | Simms et al. |

(Continued)

OTHER PUBLICATIONS

Melzer, et al. Superelastic shape memory technology of Nitinol in medicine. Min. Invas. Ther. & Allied Technol. 2000; 9(2):59-60.

*Primary Examiner* — Lori Lyjak
(74) *Attorney, Agent, or Firm* — Wilson, Sonsini, Goodrich & Rosati

(57) ABSTRACT

A deflectable component for a motorized vehicle can include a deflectable part formed at least partially from a superelastic and or shape memory material, wherein at least a portion of the deflectable component is moved to a deflected position upon application of a threshold force when moving at or above a predetermined speed, and returning to an undeflected position when moving below the predetermined speed. The deflectable component may comprise a connection link fabricated at least partially from a superelastic and/or shape memory material to tailor the flex point characteristics of a connected surface to a desired response. The deflectable component may improve the performance of motorized vehicles by improving the aerodynamic and fuel efficiency, as well as other beneficial effects.

38 Claims, 13 Drawing Sheets

U.S. PATENT DOCUMENTS

| | | |
|---|---|---|
| 5,341,571 A | 8/1994 | Prochaska |
| 5,347,714 A | 9/1994 | Prochaska |
| 5,366,176 A * | 11/1994 | Loewy et al. ............... 244/99.8 |
| 5,517,760 A | 5/1996 | Prochaska |
| 5,524,347 A | 6/1996 | Prochaska |
| 5,551,155 A | 9/1996 | Prochaska |
| 5,560,106 A | 10/1996 | Armbruster et al. |
| 5,590,468 A | 1/1997 | Prochaska |
| 5,674,135 A | 10/1997 | Franco et al. |
| 5,787,586 A | 8/1998 | Apprille et al. |
| 5,787,594 A | 8/1998 | Estrada |
| 5,813,293 A | 9/1998 | Apprille et al. |
| 5,822,869 A | 10/1998 | Metcalf et al. |
| 5,848,475 A | 12/1998 | Hill et al. |
| 5,855,071 A | 1/1999 | Apprille et al. |
| 5,918,369 A | 7/1999 | Apprille et al. |
| 5,933,960 A | 8/1999 | Avidor |
| 6,029,354 A | 2/2000 | Apprille et al. |
| 6,055,731 A | 5/2000 | Zucker |
| 6,082,006 A | 7/2000 | Cahan |
| 6,173,498 B1 | 1/2001 | Warrick et al. |
| 6,216,345 B1 | 4/2001 | Andrews |
| 6,267,402 B1 | 7/2001 | Julien |
| 6,308,416 B1 | 10/2001 | Bosy et al. |
| 6,378,211 B1 | 4/2002 | Mccool et al. |
| 6,425,184 B1 | 7/2002 | Min |
| 6,430,814 B1 | 8/2002 | Solow |
| 6,434,839 B1 | 8/2002 | Lee et al. |
| 6,530,564 B1 | 3/2003 | Julien |
| 6,571,476 B1 | 6/2003 | Bickers et al. |
| 6,598,303 B2 | 7/2003 | Bosy et al. |
| 6,789,321 B2 | 9/2004 | Simms |
| 6,804,886 B2 | 10/2004 | Wain |
| 6,851,190 B2 | 2/2005 | Guimont |
| 6,886,255 B2 | 5/2005 | Freas et al. |
| 6,916,035 B2 | 7/2005 | Houser et al. |
| 7,024,776 B2 | 4/2006 | Wain |
| 7,100,284 B2 | 9/2006 | King |
| 7,131,203 B2 | 11/2006 | Wain |
| 7,155,828 B2 | 1/2007 | Guimont et al. |
| 7,367,125 B2 | 5/2008 | Aviza |
| 2002/0023351 A1 | 2/2002 | Simms |
| 2002/0026721 A1 | 3/2002 | Lee et al. |
| 2002/0098924 A1 | 7/2002 | Houser et al. |
| 2003/0154603 A1 | 8/2003 | Guimont et al. |
| 2003/0167639 A1 | 9/2003 | Sassenberg |
| 2003/0204954 A1 | 11/2003 | Wain |
| 2004/0020053 A1 | 2/2004 | Wain |
| 2004/0158990 A1 | 8/2004 | Heide |
| 2004/0168323 A1 | 9/2004 | Lembke |
| 2005/0102847 A1 | 5/2005 | King |
| 2005/0126007 A1 | 6/2005 | Aviza |
| 2005/0172493 A1 | 8/2005 | Fischer et al. |
| 2005/0178007 A1 | 8/2005 | Guimont et al. |
| 2005/0246899 A1 | 11/2005 | Wain |
| 2006/0080837 A1 | 4/2006 | Johnson et al. |
| 2006/0112563 A1 | 6/2006 | Wain |
| 2006/0143925 A1 | 7/2006 | Johnson et al. |
| 2006/0236546 A1 | 10/2006 | Johnson et al. |
| 2006/0283025 A1 | 12/2006 | Follo et al. |
| 2006/0288595 A1 | 12/2006 | Takeshita |
| 2007/0028449 A1 | 2/2007 | King |
| 2007/0089297 A1 | 4/2007 | Houbolt et al. |
| 2007/0151107 A1 | 7/2007 | Westerhof et al. |
| 2007/0151108 A1 | 7/2007 | Westerhof et al. |
| 2007/0214662 A1 | 9/2007 | Efthimiadis et al. |
| 2007/0220753 A1 | 9/2007 | Aviza |
| 2008/0040936 A1 | 2/2008 | Stiles |
| 2008/0196251 A1 | 8/2008 | Royle |
| 2008/0209734 A1 | 9/2008 | Nicoll |

* cited by examiner

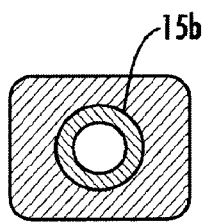
FIG. 1F
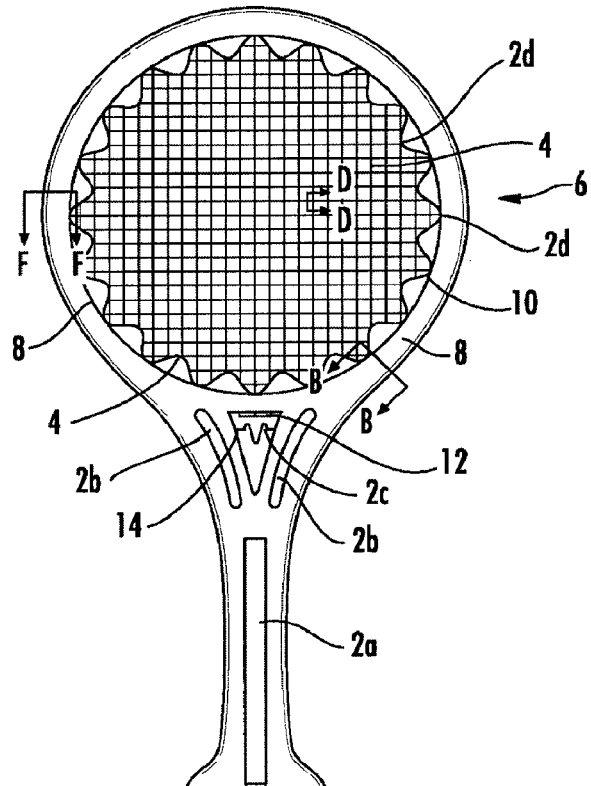
FIG. 1A
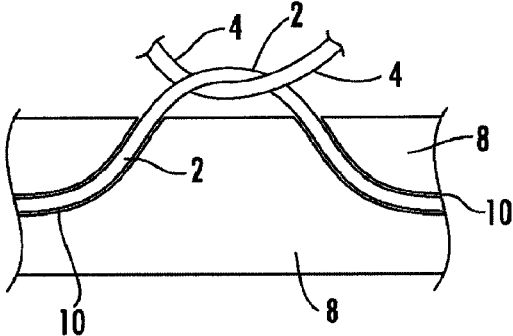
FIG. 1E
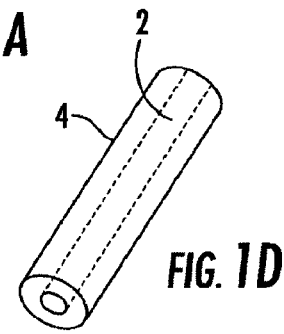
FIG. 1D
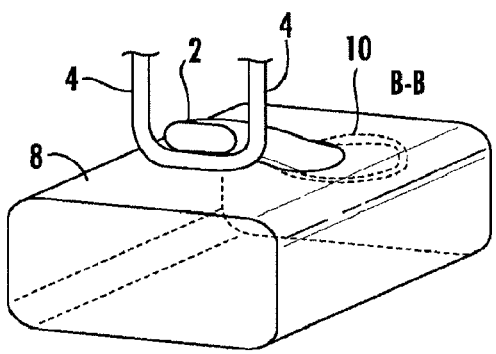
FIG. 1C
FIG. 1B

MOTORIZED VEHICLES WITH DEFLECTABLE COMPONENTS

CROSS-REFERENCE

This application is a continuation application of Ser. No. 11/160,850, filed on Jul. 12, 2005 now abandoned, which is a continuation application of Ser. No. 10/050,944, filed on Jan. 22, 2002, now U.S. Pat. No. 6,916,035, which claims the benefit of U.S. Provisional Application No. 60/263,418, filed Jan. 23, 2001, which all are incorporated herein by reference in their entirety.

BACKGROUND OF THE INVENTION

Current techniques for providing components for athletic or other devices involve using a relatively elastic, semi rigid material that is positioned at the flex points and limits the degree of bending of the device. These current components interfere with optimal recoil of the device about the flex points in response to an opposing deflection. In addition, these current components are limited in their ability to prevent plastic deformation upon frequent or significant rotation, bending or other motion unless they are fabricated extremely thick; however, when fabricated thick they further hinder the desired movement of the device about the flex point. Another conventional component configuration incorporates wood, Kevlar, stainless steel, carbon, carbon fiber, aluminum, fiberglass, other laminates, graphite, or other solid metal or alloy component incorporated in the device to include a pivot that enables movement of the component about the flex point or points. These current components severely limit the available flexion of the device thus, depending upon the application, may adversely impact the performance. As such they greatly inhibit the desired rotation, bending, or other motion. A need thus exists for superelastic components incorporated in various devices that are capable of being deflected a predetermined amount in response to an external force and exert an opposing force in response to the deflection. As such, these superelastic components preserve or enhance the response of the device to any flexion and permit frequent and dramatic twisting, bending, or other motion which typically would cause deformation or failure of conventional devices that do not utilize superelastic components.

SUMMARY OF THE INVENTION

In one general aspect, a racket includes a handle section, a head section, and a connecting section positioned between the handle section and the head section. One or more of the handle section, the head section, and the connecting section include a superelastic metal.

Implementations and embodiments of the racket may include one or more of the following features. For example, the superelastic metal may be at least partially surrounded by a second material. The superelastic metal may include a wire mounted to the head section of the racket to form an enclosed opening through which a racket string passes. The head section of the racket may include one or more interior channels through which the wire passes.

The head section may include the superelastic component around at least a portion of the circumference of the racket. The superelastic component may have a tubular cross-sectional profile.

The connecting section may include a bifurcation having two arms connected to the head section, and at least one of the arms may include a superelastic component.

The racket may further include a superelastic dampener. The connecting section may include a bifurcation having two arms connecting to the head section and forming an opening between the two arm and the dampener may be connected to the two arms and pass between the two arms.

The handle section may include the superelastic component. The superelastic component may be in the form of a longitudinal component extending generally colinearly with the handle section. The superelastic component also may be in the form of a circumferential component extending around the circumference of the handle section. The superelastic circumferential component may be the entirety of at least a portion of the length of the handle section.

In another general aspect, a set of ski components may include at least one ski that includes a superelastic component that is configured and positioned with respect to the ski to provide an elastic response of the ski to a deflection.

Implementation and embodiments of the set of ski components may include one or more of the following features. For example the set may further include a ski pole that includes a handle, a rod, a spike, and a ring. One or more of the handle, the rod, the spike, and the ring includes a superelastic component and the superelastic component is configured and positioned to provide an elastic response of the ski pole to a deflection. The rod may include an upper member and a lower member and an angled connecting member positioned between the upper member and the lower member. The angled connecting member includes a superelastic metal that is configured to elastically flex when one or both of the upper member and the lower member are deflected.

The superelastic component may be positioned as a bottom surface of the ski and the bottom surface of the ski may be configured to be in contact with a ski surface. The superelastic component may have a curvature between opposite outside edges and/or the superelastic component may have a flat surface between opposite outside edges. The superelastic component may be removably mounted to the ski.

The may be positioned at least partially within the ski. The superelastic component may include at least two parallel members. The superelastic component may include multiple members that extend collinearly along at least a portion of the length of the ski.

In one aspect, this application relates to athletic devices, such as rackets and ski equipment, and components incorporated in athletic devices for enhancing the performance of the athletic activity and other devices that undergo flexion during use. In another aspects this application relates to athletic devices, such as rackets and ski equipment, that incorporate features to better enable them to withstand flexing and provide a dynamic response to such flexion. In addition, in yet another aspect, the this application relates to components that are incorporated in various devices, such as rackets and ski equipment, that permit frequent flexing of the component without permanently deforming and provide the desired radial stiffness, torsional rigidity, axial stiffness, and recoil or spring force. As such, the device is reinforced by tailoring the stress, strain, and torque characteristics to the application. The superelastic components also preserve the flexibility of the device and/or intensify the spring force exerted upon deflection. In particular, the superelastic components provide a directional force in response to an opposing deflection.

The superelastic components are intended to reinforce, strengthen, and/or enhance the performance of various athletic devices and other devices. The superelastic components improve the performance of athletic devices and other devices by increasing the contact duration between the active element of the device and objects the devices are configured to exert force. For example, rackets, swim fins, baseball bats, hockey sticks, golf clubs, skis, snowboards, surfboards, razors, and toothbrushes incorporate superelastic components to produce greater control of force exerted upon objects without a reduction in power. In addition, rolling or sliding devices such as bicycles, automobiles, rollerblades, skateboards, skates, or other devices may incorporate superelastic components to increase the duration of contact between the wheels or blades and the ground or other surface or aerodynamic components.

The superelastic components also provide increased resistance to breakage or plastic deformation of the athletic device or other devices, especially when exposed to frequent deflections. For example, the resistance to failure, resulting from fatigue or excess deflection, for rackets, archery bows, swim fins, skis, ski poles, snowboards, surfboards, vaulting poles, golf clubs, golf balls, hockey sticks, boat oars, canoe paddles, fishing poles, boat masts, automobile suspension components, aerodynamic components, bicycle shocks, bicycle frame, bicycle spokes, rollerblade shocks, skateboard parts, snowshoes, backpack frame, tent frame, kite frame, or other components which are exposed to frequent and extreme deflections is dramatically improved when using superelastic components.

Superelastic components are able to decrease the weight of the athletic device or other component without sacrificing strength. For example, rackets, golf clubs, baseball bats, boat masts, automobile suspension components, aerodynamic components, bicycle frames, snowboards, skateboards, skis, ski bindings, snowboard bindings, backpack frame, kite frame, or other device may be fabricated lighter by leveraging the ability to decrease wall thickness or other dimensions of the superelastic components without a reduction in tensile strength.

The superelastic components also enable applying a specific force at a flex point of the device to enhance the recoil resulting from a desired deflection. For example, rackets, swim fins, baseball bats, boat oars, hockey sticks, golf clubs, golf balls, other balls, vaulting poles, javelin poles, boat mast, automobile suspension components, aerodynamic components, archery bow, canoe paddles, fishing pole, or other devices are deflected by an object and rely on elastic recoil to transfer potential energy, induced from a deflection of the superelastic component, to the object thereby propelling the object in a predetermined direction. Different components having different force characteristics and/or enabling different degrees of movement may be used in various devices to distribute the spring force throughout the device.

The above described features and many further features and advantages of the present inventions will be elaborated in the following detailed description, the accompanying drawings, and the claims.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1a is a perspective view of a racket containing superelastic components.

FIGS. 1b and 1c are cross-sectional views and side-sectional views, respectively of racket frame of FIG. 1a incorporating a superelastic component mechanism for attaching the strings to the frame.

FIG. 1d is a side view of a section of a racket string of the racket of FIG. 1a incorporating a superelastic component central element.

FIG. 1e is a front view of the handle of the racket of FIG. 1a with a superelastic handle section.

FIG. 1f is a cross-sectional view of the head of the racket of FIG. 1a with a superelastic head section.

FIGS. 6b and 6c are cross-sectional views of the archery bow frame and archery bow string in FIG. 6a.

FIG. 7c is a side-sectional view of a hockey stick that contains superelastic components.

FIG. 8a is a side view of a golf club that contains superelastic components.

FIG. 8b shows a cross-sectional view of the club head of the golf club in FIG. 8a;

FIGS. 8c and 8d are cross-sectional views of the shaft of the golf club in FIG. 8a.

DETAILED DESCRIPTION OF THE INVENTION

Figure 2A:
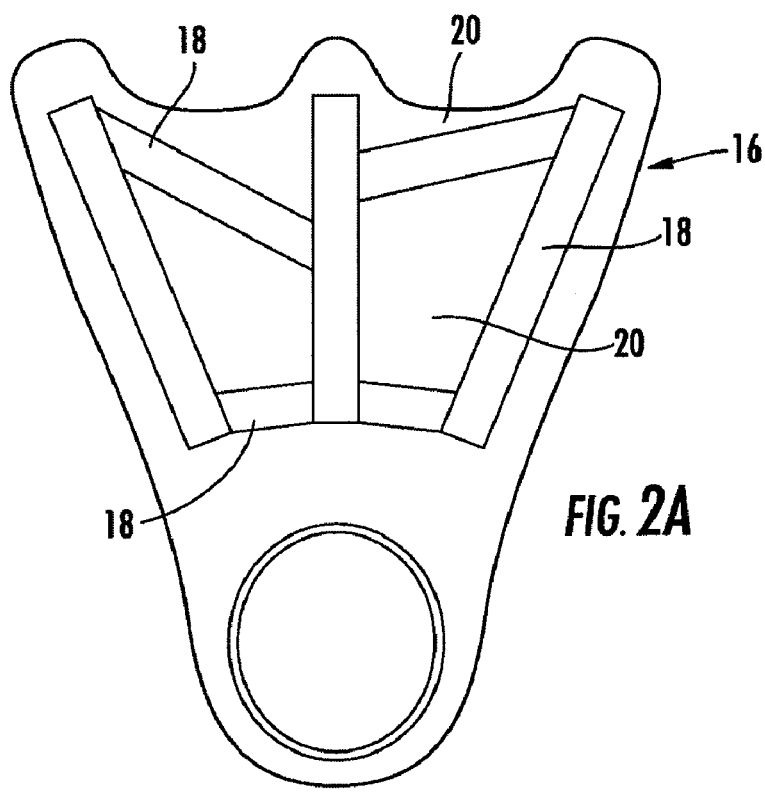
FIGS. 2a and 2b are a top view and a side view, respectively, of a swim fin that contains superelastic components.

There is a basic terminology that is used to describe metals with elastic, superelastic, or shape-memory behavior. Elasticity is the ability of the metal, under a bending load, for example, to deflect (strain) and not take a permanent "set" when the load (stress) is removed. Common elastic metals can strain to about two percent before they set. Superelastic metals are unique in that they can withstand up to about ten percent strain before taking a set. This is attributed to a "stress-induced" phase change within the metal to allow it to withstand such dramatic levels of strain. Depending on the composition of the metal, this temperature that allows such a phase change can vary. And, if the metal is "set" at one temperature, and then the temperature is changed, the metal can return to an "unset" shape. Then, upon returning to the previous "set" temperature, the shape changes back. This is a "shape-memory" effect due to the change in temperature changing the phase within the metal. As described below, there are different metal behaviors and these can vary with the composition of various shape-memory alloys.

Elasticity.

When a metal is loaded (stressed) and undergoes, for example, bending, it may deflect (strain) in a "springy" fashion and tend to return to its original shape when the load is removed, or it may tend to "set" and stay in a bent condition. This ability to return to the original shape is a measure of the elasticity or "resilience" of the metal. This ability for a metal to be resilient is desirable for such things as springs, shock absorbing devices, and even wire for orthodontic braces, where the ability to deflect, but not deform (set) is important to maintain an applied force.

Plasticity.

If, under a bending load, the metal takes a set, it is said to have plastically (versus elastically) deformed. This is because the imposed stress, produced by the bending load, has exceeded the "yield strength" (stress) of the metal. Technically, this level of stress that produces a set, is referred to as the "elastic limit", but is about the same as the yield strength. If the applied load increases past the yield strength of the metal, it will produce more plasticity and can eventually break. The higher the yield strength of the metal, the more elastic it is. "Good" elastic metals can accommodate up to about two percent strain prior to taking a set. But this is not the only factor governing "elasticity".

Modulus.

Another factor that determines the ability of a metal to deflect to a given, desired amount, but not take a set, is the "elastic modulus", or often called the modulus of elasticity. The "modulus" of the metal is an inherent property. Steels, for example, have a relatively high modulus (30 msi) while the more flexible aluminum has a lower modulus of about 10 msi. The modulus for titanium alloys is generally between 12 and 15 msi.

Resilience.

Resilience is the overall measure of elasticity or "springback ability" of a metal. The ratio of the yield strength divided by the modulus of the metal is the resilience. Although it is one thing for a metal to be resilient, it must also have sufficient strength for the intended service conditions.

Superelastic Metals.

As discussed above, when a metal is loaded, each increment of load (stress) produces a given increment of deflection (strain) within the metal. And the metal remains elastic if the applied load is below the yield stress. However, there is a unique class of metal alloys that behave in an even more elastic manner. These are the "superelastic" metals, for which, for a given applied stress (load) increment, the strain in the metal can reach 5 or 6 percent or more without taking a set. In this type of metals, the overall strain required to produce a set can reach an impressive 10 percent. This phenomenon is related to a phase change within the metal, and which is induced by the applied stress. This "stress-induced" phase change also can be used to set the metal to a shape at one temperature and return to another shape at another temperature. This is the "shape-memory" effect, discussed below.

The most common superelastic metal, which is used in many commercial applications, is an alloy comprised of about equal parts of nickel (Ni) and titanium (Ti), and has a trade name of "Nitinol". It is also referred to as "NiTi". By slightly varying the ratios of the nickel and titanium in Nitinol, the stability of the internal phases in the metal can be changed. Basically, there are two phases: (1) an "austenite" phase and (2) a lower-temperature, "martensite" phase. When the metal is in an austenitic phase condition, and is stressed, a stress-induced martensite forms, resulting in the superelasticity.

It is preferred that the Nickel to Titanium ratio in the Nitinol be selected so that the stress-induced martensite forms at ambient temperatures for the case of superelastic braces and other support devices, which are used in ambient conditions. The specific composition can be selected to result in the desired temperature for the formation of the martensite phase (Ms) and the lower temperature (Mf) at which this transformation finishes. Both the Ms and Mf temperatures are below the temperature at which the austenite phase is stable.

Shape Memory.

By manipulating the composition of Nitinol, a variety of stress-induced superelastic properties can result, and over a desired, predetermined service temperature range. This allows the metal to behave in a "shape-memory" fashion. In this regard, the metal is "set" to a predetermined, desired shape at one temperature when in a martensitic condition, and returns to the original shape when the temperature returns to the austenitic temperature. Then, upon returning to the martensitic temperature, the shape of the set condition returns. Nitinol is often referred to as a shape-memory alloy.

Other Superelastic Metals.

Although the example of Nitinol, discussed above, is, by far, the most popular of the superelastic metals, there are other alloys that can also exhibit superelastic or shape-memory behavior. These include:

Copper—40 at % Zinc
Copper—14 wt % Aluminum—4 wt % Nickel
Iron—32 wt % Manganese—6 wt % Silicon
Gold—5 to 50 at % Cadmium
Nickel—36 to 38 at % Aluminum
Iron—25 at % Platinum
Titanium—40 at % Nickel—10 at % Copper
Manganese—5 to 35 at % Copper
Titanium—49 to 51 at % Nickel (Nitinol)

The corrosion resistance of Nitinol is superior to that of commonly used 3161 stainless steel, and, if surface oxidized or passivated carefully, can reach corrosion resistance comparable to the most popular titanium implant alloy, Ti6Al4V.

This specification discloses a number of embodiments, mainly in the context of reinforcement and performance enhancement for athletic devices and other devices. Nevertheless, it should be appreciated that the embodiments are applicable for use in other indications involving devices that contain structures that flex, restrict motion to a desired path, and/or exert a desired force in response to an externally induced deflection. The embodiments described herein are configured for specific devices; however, it should be noted that the embodiments may be tailored to other devices not specifically discussed by changing the geometry and sizes of the structures.

The embodiments described herein provide four primary benefits to athletic devices and other devices. The superelastic components improve the performance of athletic devices and other devices by increasing the contact duration between the active element of the device and objects the devices are configured to exert force. The superelastic components also provide increased resistance to breakage or plastic deformation of the athletic device or other devices, especially when exposed to frequent deflections. Superelastic components are able to decrease the weight of the athletic device or other component without sacrificing strength. The superelastic components also enable applying a specific force at a flex point of the device to enhance the elastic recoil resulting from a desired deflection. It should be noted that other benefits may arise from the use of superelastic components in athletic devices and other components.

The embodiments described herein include athletic devices, and components in athletic devices, that are fabricated from superelastic (or pseudoelastic) shape memory alloys. These superelastic components elastically deform upon exposure to an external force and return towards their preformed shape upon reduction or removal of the external force. The superelastic components may exhibit stress-induced martensite characteristics in that they transform from the preshaped austenite form to the more soft and ductile martensite form upon application of stress and transform back toward the stronger and harder austenite form once the stress is released or reduced; this depends on the composition of the superelastic shape memory alloys which affects the temperature transition profile. Superelastic shape memory alloys also enable straining the material numerous times without plastically deforming the material. Superelastic shape memory alloys are light in weight, and exhibit excellent tensile strengths such that they may be used in athletic equipment, personnel items, or other devices without dramatically increasing the weight of the device, or making the device thick or bulky. The utility of superelastic materials in components for athletic or other devices is highlighted by the inherent properties of such materials; they are able to withstand continuous and frequent deflections without plastically deforming or observing fatigue failures.

These components may also be elastically deflected into small radii of curvatures and return towards their preformed configuration once the external force causing the deflection is removed or reduced. Many other known metals, alloys, and polymers plastically deform or fail when deflected into similar radii of curvature or exposed to comparable strains; as such these other metals, alloys, and polymers do not return towards their original configuration when exposed to the amount of deflection components are expected to endure. Therefore superelastic components may inherently incorporate flex regions, which conventional athletic devices and other devices are unable to accommodate, thereby eliminating the need for two or more components being connected through a hinge structure that requires pivot points between the two or more components. Thus the complexity and cost of athletic devices and other devices that incorporate superelastic components is significantly reduced when compared to conventional devices. In addition, superelastic components permit deflections into smaller radii of curvature than other metals, alloys, and polymers resulting in larger strains, and they are capable of exerting substantial force when deflected, ensuring the superelastic components return towards their preformed shape after being elastically deformed.

Superelastic components may be fabricated from shape memory alloys (e.g., nickel titanium) demonstrating stress-induced martensite at ambient temperature. Of course, other shape memory alloys may be used and the superelastic material may alternatively exhibit austenite properties at ambient temperature. The composition of the shape memory alloy may be chosen to tailor the finish and start martensite transformation temperatures (Mf and Ms) and the start and finish austenite transformation temperatures (As and Af) to the desired material response.

When fabricating shape memory alloys that exhibit stress induced martensite, the material composition may be chosen such that the maximum temperature that the material exhibits stress-induced martensite properties (Md) is greater than Af and the range of temperatures between Af and Md covers the range of ambient temperatures the component members are exposed.

When fabricating shape memory alloys that exhibit austenite properties and do not transform to martensite in response to stress, the material composition may be chosen such that both Af and Md are less than the range of temperatures the components are exposed. Of course, Af and Md may be chosen at any temperature provided the shape memory alloy exhibits superelastic properties throughout the temperature range to which they are to be exposed. Nickel titanium having an atomic ratio of 51.2% Ni and 48.8% Ti exhibits an Af of approximately −20.degree. C.; nickel titanium having an atomic ratio of 50% Ni to 50% Ti exhibits an Af of approximately 100.degree. C. [Melzer A, Pelton A. Superelastic Shape-Memory Technology of Nitinol in Medicine. Min. Invas. Ther. & Allied Technol. 2000: 9(2) 59-60].

Such superelastic materials are able to withstand strain as high as 10% without plastically deforming. As such, these superelastic materials are capable of elastically exerting a force upon deflection. Materials other than superelastic shape memory alloys may be used as components provided they can be elastically deformed within the temperature, stress, and strain parameters required to maximize the elastic restoring force thereby enabling components of the athletic devices and other devices to exert a directional force in response to an induced deflection. Such materials include other shape memory alloys, spring stainless steel 17-7PH, cobalt chromium alloy (Elgiloy), nickel titanium cobalt, platinum tungsten alloys, superelastic and crosslinked polymers including those that have been irradiated, annealed, etc.

The superelastic components described herein may be fabricated from at least one rod, wire, band, tube, sheet, ribbon, other raw material having the desired pattern, cross-sectional profile, and dimensions, or a combination of cross-sections. The superelastic components are cut into the desired pattern and are thermally formed into the desired 3-dimensional geometry. The rod, wire, band, sheet, tube, ribbon, or other raw material may be fabricated by extruding, press-forging, rotary forging, bar rolling, sheet rolling, cold drawing, cold rolling, using multiple cold-working and annealing steps, or otherwise forming into the desired shape. Then the components may be cut into the desired length and/or pattern. Conventional abrasive sawing, waterjet cutting, laser cutting, electron discharge machining ("EDM") machining, photo-chemical etching, or other etching techniques may be employed to cut the components from the raw material.

Ends or any sections of the rod, wire, band, sheet, tubing, ribbon, or other raw material may be attached by laser welding, adhesively bonding, soldering, spot welding, or other attachment means. This encloses the superelastic components to provide additional reinforcement, eliminate edges, or other purpose. Multiple rods, wires, bands, sheets, tubing, ribbons, other raw materials, or a combination of these may be bonded to produce a composite superelastic component and form the skeleton of the athletic device or other devices.

When thermally forming the superelastic components, the superelastic material(s), previously cut into the desired pattern and/or length, are stressed into the desired resting configuration over a mandrel or other forming fixture having the desired resting shape of the athletic or other device component, and the material is heated to between 300 and 650 degrees Celsius for a period of time, typically between 1 and 30 minutes.

Once the volume of superelastic material reaches the desired temperature, the superelastic material is quenched by inserting into chilled water or other fluid, or otherwise allowed to return to ambient temperature. As such, the superelastic components are fabricated into their resting configuration. When extremely small radii of curvature are desired, multiple thermal forming steps may be utilized to sequentially bend the rod, wire, band, sheet, tubing, ribbon or other raw material into tighter radii of curvature.

When fabricating the superelastic components from tubing, the raw material may have an oval, circular, rectangular, square, trapezoidal, or other cross-sectional geometry capable of being cut into the desired pattern. After cutting the desired pattern of superelastic components, the components are formed into the desired shape, heated, for example, between 300.degree. C. and 650.degree. C., and allowed to cool in the preformed geometry to set the shape of the components.

When fabricating the superelastic components from flat sheets of raw material, the raw material may be configured with at least one width, W, and at least one wall thickness, T, throughout the raw material. As such, the raw sheet material may have a consistent wall thickness, a tapered thickness, or sections of varying thickness. The raw material is then cut into the desired pattern of superelastic components, and thermally shaped into the desired 3-dimensional geometry. Opposite ends of the thermally formed component member may be secured by using rivets, applying adhesives, welding, soldering, mechanically engaging, utilizing another bonding means, or a combination of these bonding methods. Opposite ends of the thermally formed components may alternatively be free-floating to permit increased deflection.

Once the components are fabricated and formed into the desired three-dimensional geometry, the components may be electropolished, tumbled, sand or bead blasted, ground, or otherwise treated to remove any edges and/or produce a smooth surface.

Holes, slots, notches, other cut-away areas, or regions of ground material may be incorporated in the component design to tailor the stiffness profile of the component. Such holes, slots, notches, or other cut-away areas are also beneficial to increasing the bond strength or reliability when attaching the covering(s), coating(s) or laminate(s) to the superelastic components. Cutting and treating processes described above may be used to fabricate the slots, holes, notches, cut-away regions, and/or ground regions in the desired pattern to taper the stiffness along the component, focus the stiffness of the components at specific locations, reinforce regions of the superelastic component, or otherwise customize the stiffness profile of the athletic or other device.

Referring to FIGS. 1a-f, a racket 6 (e.g., tennis racket, racquetball racket, squash racket, badminton racket, jai lai racket, lacrosse racket, etc.) incorporates superelastic components 2 distributed throughout the stem or handle, the frame, head, and/or the strings of the racket. In general, the racket includes a handle section, a head section, and a connecting section that is positioned between the handle section and the head section. One or more of the handle section, the head section, and the connecting section includes a superelastic metal. The distribution and characteristics of the superelastic component(s) determine the amount of force and the directionality of the force the racket exerts in response to an external force such as a deflection. The superelastic components may be fabricated as a wire, a rod, or of another geometry containing at least one width, W, at least one length, L, and at least one thickness, T, and may be configured to produce a desired stiffness and force profile. The width, length, and/or thickness may vary throughout the superelastic components to vary the stiffness profile and resulting response to movement.

The racket 6 shown in FIG. 1a incorporates one superelastic component 2a in the stem extending from the handle to the bifurcation; two superelastic components 2b, one on each side of the bifurcation and extending to the head of the racket; one superelastic component 2c connecting opposing sides of the bifurcation and acting as a dampener 14, and at least one superelastic component 2d distributed throughout the head frame 8 of the racket and used to attach the string(s) 4 to the racket. It should be noted that the entire frame and/or the entire stem may be fabricated from superelastic components. During manufacturing, the cross-section of each superelastic component may be a circular rod, a rectangular band, a circular or elliptical wire, a square ribbon, a donut shaped tube, a coil, or any other geometry that provides the desired stiffness to impart the reinforcing and spring forces. It should be noted that the orientation of the superelastic components relative to the racket depends on the purpose for the racket and helps dictate the restriction of abnormal motion and the spring characteristic of the racket.

The racket embodiment in FIG. 1a has a frame that contains channels 10 through which at least one string mounting component 2d passes. The mounting component may be in the form of a superelastic wire that is mounted to the head section to form an enclosed opening through which a racket string may pass. The at least one string mounting component 2d extends throughout the interior surface of the frame 8 passing from within one channel 10, along the interior surface of the frame outside the channels, and into an adjacent channel 10, as shown in FIG. 1c. The at least one string mounting component 2d extends throughout the interior surface of the frame 8 in a sinusoidal, undulating, triangular, or other geometry such that openings between the at least one string mounting component 2d, which is made form a superelastic metal, and the frame 8 allow at least one string 4 to pass, as shown in FIG. 1b. The superelastic component(s) (i.e., string mounting component 2d) extending throughout the interior surface of the frame 8 terminates at a tensioning mechanism or anchoring element 12 designed to secure this superelastic component(s). The tensioning mechanism or anchoring element 12 may also enable tightening or loosening this superelastic component(s) throughout the frame 8. Multiple tensioning mechanisms 12 may be distributed throughout the frame 8 and may be used to manipulate multiple superelastic components and distribute the force profile throughout the frame 8. The ability to alter the tension of the superelastic component(s) enables changing the amount of elastic recoil for the strings 4 and tailor the force exerted against a ball or other item that the racket is intended to hit. A ratcheting mechanism with a long latch may be incorporated in the tensioning mechanism to permit rapid changing of the tension in the superelastic component(s). As such the tension of the strings may be selectively changed depending on the desired hitting response. The mechanisms described above that enable varying the tension of the strings may alternatively apply to modifying superelastic components in the yoke, neck, or other sections of the frame that can be lengthened or shortened. It should be noted that any number of superelastic components may be chosen depending on the manufacturing process, the desired spring constant, and the desired stiffness profile.

The superelastic components 2 distributed throughout the interior surface of the frame 8 are configured to flex toward the center of the racket in response to an external force, such as a ball or other object hitting the strings 4, and return towards their preformed shape thereby exerting a spring force against the ball or other object. This response keeps the ball or other object in contact with the strings 4 of the racket longer thereby improving the directionality or control of hitting the ball or other object with a racket having such an apparatus, without sacrificing power.

As shown in FIG. 1d, the strings 4 wound throughout the racket frame 8 incorporate a central superelastic component core to enhance the effect of hitting a ball or other object. Alternatively, the strings 4 themselves may be fabricated from a superelastic material. The strings may be tightly wound throughout the head along a single plane located along the mid-region of the head as shown in the embodiments above. Alternatively, sets of strings may be offset in parallel planes or staggered in front of and behind the mid-region a short distance to increase the amount of top-spin or slice of the ball. In addition, the sets of strings may contain different tension parameters to enhance this spinning effect.

The channels 10 incorporated in the frame of the racket may alternatively be fabricated as a continuous, enclosed cavity extending from the handle through the head of the racket for the purposes of containing a dense fluid or movable solid, such as dense particles. The ability of the fluid or movable solid to migrate throughout the head during the swinging movement of the racket increases the inertia at the moment of impact. The racket can include internal or external channels to contain the fluid or solid.

The stiffness and spring characteristics of superelastic components 2a, 2b distributed throughout the stem and bifurcation of the racket determine the force required to deflect the superelastic components and the amount of elastic recoil. The superelastic components 2a, 2b located in the stem and bifurcation of the racket provide a lightweight spring mechanism used to increase the force exerted against a ball or other object. The superelastic components 2a, 2b in the stem and bifurcation of the racket 6 may also be fabricated with such a cross-sectional profile to tailor the flexion of the stem and bifurcation of the racket along a desired path. For example, the superelastic components 2a, 2b in the stem and bifurcation of the racket may be fabricated with a rectangular or ovalized cross-section to ensure the flexion of the racket extends along the plane perpendicular to the racket head. Alternatively, the superelastic components 2a, 2b in the stem and/or bifurcation of the racket may be fabricated in a helical shape to enable slight rotation of the racket thereby improving the ability to create a topspin and/or slice.

As shown in FIG. 1a, a dampener 14 may connect opposite sides of the bifurcation to reduce vibrations transferred to the stem of the racket. This helps prevent tennis elbow, carpal tunnel, tendonitis, or other injury resulting from frequent stressing of the elbow, wrist, or other joint. The dampener 14 in this embodiment consists of a superelastic component 2 wound into a helical coil and attached to each end of the bifurcation. The pitch of the superelastic coil may be chosen to match the resonance frequency of the vibrations propagating from the racket head. The superelastic coil dampener thereby counters the vibrations at the racket head to prevent the vibrations from reaching the handle of the racket. The dampener 14 may alternatively be fabricated from tube stock cut into the desired coil profile that matches the desired resonance frequency. Such dampeners may alternatively be attached to the interior surface of the racket head at the top or bottom. Alternatively, the racket head may incorporate such dampeners inside sections of the frame 8, especially at the bottom or top. Such dampener may alternatively be fabricated in the stem of the racket or emanating from the handle of the racket.

Referring specifically to FIG. 1e, the handle of the racket may include a superelastic section 15a that is positioned between, for example, graphite, metal, polymer, such as Kevlar or another high strength polymer, composite, or other conventional racket material. The section 15a, provides dampening, stiffness, and/or spring characteristics. The section 15a includes portions for mounting to the handle. For example, the section 15a can include reduced diameter portions around which the handle is fabricated. The section 15a also may include extensions that extend longitudinally and around which the handle may be fabricated. The extensions can be in the form of a coil or a straight rod or finger. The extensions may have a roughened surface, three-dimensional surface, openings, or channels that improve the bonding of the handle to the section 15a.

Referring to FIG. 1f, the head of the racket may include a superelastic section 15b around at least a portion of the circumference of the head. The superelastic section 15b can be of any cross-sectional shape, such as a tubular, square, rod, star, or other cross-sectional shape. The section 15b may be encased in a second material, such as graphite, aluminum, a polymer composite, of other conventional racket material. The section 15b may have a hollow interior that may be filled with a material or may be left open to reduce or minimize the weight of the racket.

Figure 2B:
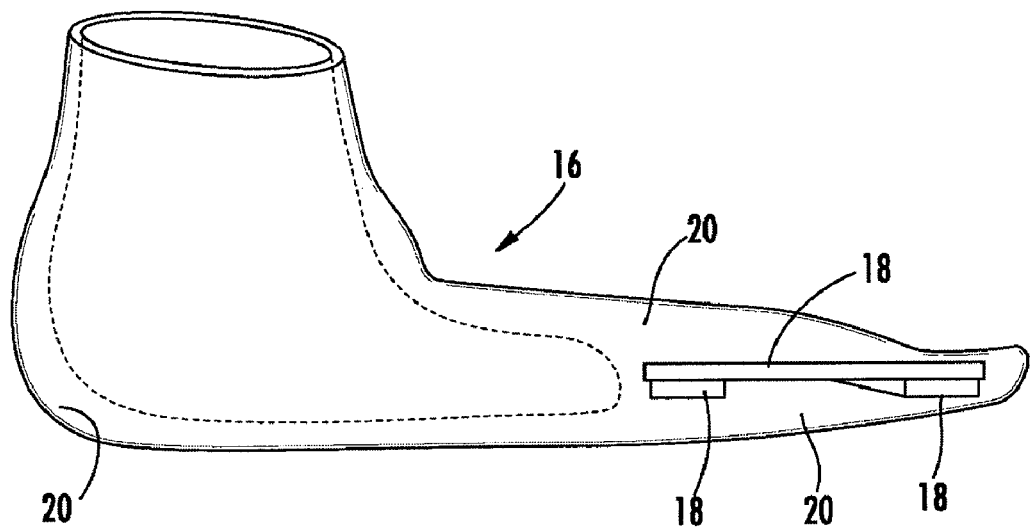

FIGS. 2a and 2b show swim fins 16 that contain superelastic components. These components may be removable and replaceable with components of different flexibility and stiffness to vary the performance characteristics of the swim fins. The swim fins may incorporate at least one superelastic component 18 embedded in at least one covering 20. The covering 20 may be fabricated from a rubber, urethane, silicone, or other polymer formed into the desired shape, as shown. The superelastic components 18 illustrated in FIGS. 2a and 2b are preferably fabricated with a rectangular or ovalized cross-section and are distributed throughout the swim fins 16 to tailor the spring force such that the swim fins elastically return towards their preformed shape in response to a deflection. This increases and optimizes the force exerted by the fins against surrounding water to improve the efficiency and velocity when swimming with fins. The stiffness of the superelastic components 18 may be tapered from the proximal region of the fins, located at front end of the boot, at the heal of the fin, or any location relative to the boot, and extend to the distal end of the fins. This may be accomplished by decreasing the width or wall thickness of the superelastic components as they extend from the boot distally, or by distributing individual superelastic components such that the stiffness decreases distally, as shown in FIG. 2a. This aids in matching the desired force response of the fins to the fluid mechanics of propelling a body through water. Superelastic components may also be incorporated in hand fins or other devices designed to displace a volume of water or other liquid in an efficient manner.

Figure 3A:
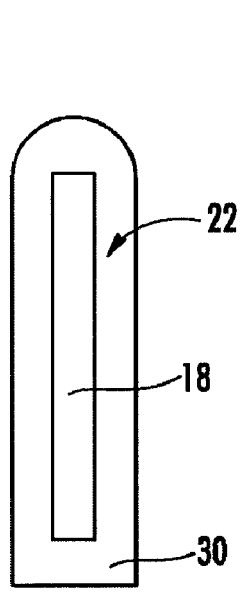
FIGS. 3a and 3b are a top view and a side view, respectively, of a ski that contains superelastic components.
Figure 3C:
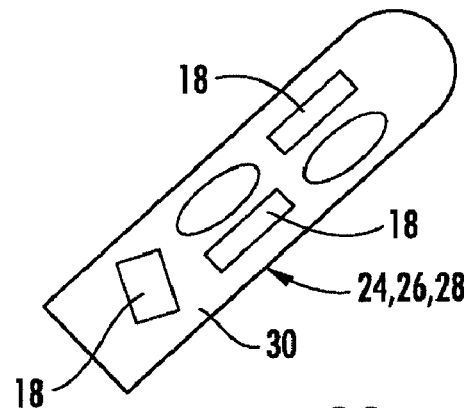
FIGS. 3c and 3d are a top view and a side view, respectively, of a snowboard, skateboard, or surfboard that contain superelastic components.
Figure 3D:
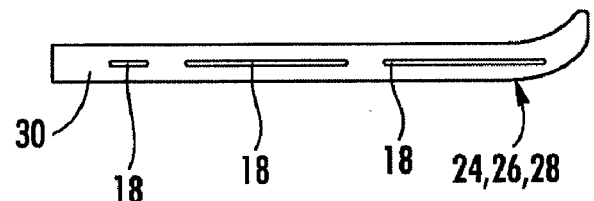
Figure 3B:
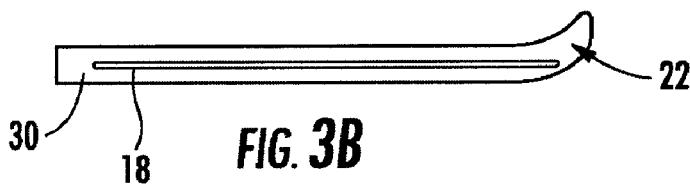

The superelastic components previously described for the racket and swim fins may additionally be modified accordingly for other athletic devices or other devices. For example, FIGS. 3a, 3b, and 3g-3n show various configurations of a ski 22 (e.g., water ski, snow ski, ski mobile, snow vehicle, sled, or any other type of ski or device that uses skis or runners) that incorporates at least one superelastic component 18 within a housing 22 that is fabricated from fiberglass, wood, acrylonitrile butadiene styrene (ABS), Kevlar, carbon, carbon fiber, sintered polyethylene material (P-TEX), or other material that is suitable for a ski. FIGS. 3c and 3d show boards 30 (snowboards 24, skateboards 26, surfboards 28, or other athletic board) that incorporates at least one superelastic component 18 within a housing 22 that is fabricated from fiberglass, wood, acrylonitrile butadiene styrene (ABS), Kevlar, other laminate, carbon, carbon fiber, sintered polyethylene material (P-TEX), or other material that is suitable for a board. The housing 22 may be fabricated such that the superelastic component 18 is removable and replaceable with a different superelastic component 18 having a different stiffness or spring characteristic. Alternatively, the skis 22 or boards (24 or 26 or 28) may be completely fabricated from one or more superelastic components 18 oriented and fabricated to completely define the housing 22. The superelastic components generally cause more of the ski or board base to contact the surface, such as the snow, at any one time to provide better control and maneuvering abilities.

Figure 3E:
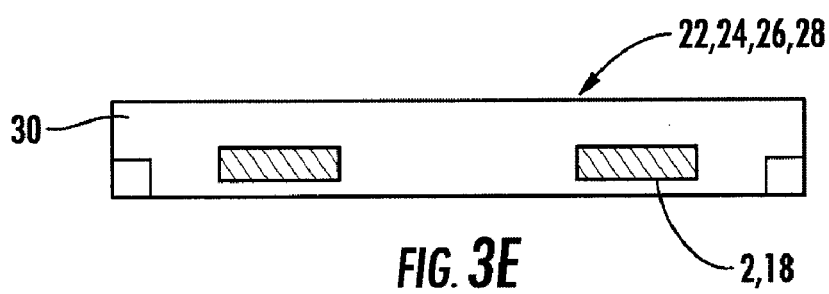
FIGS. 3e and 3f are cross-sectional views of skis, snowboards, skateboards, or surfboards that contain superelastic components.
Figure 3F:
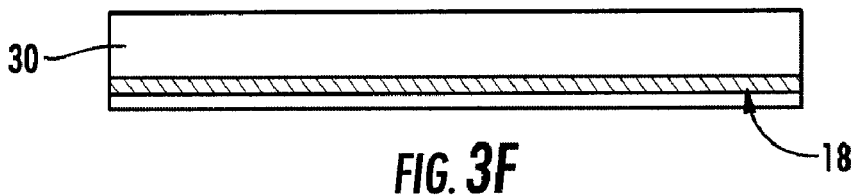

The superelastic component(s) 18 in the skis or boards may be distributed throughout the housing 22 to tailor the stiffness and flexion profile to the desired activity. For example, as shown in FIG. 3c, the superelastic components 18 may be distributed throughout the board (24, 26, or 28) such that one or both sides of the board differ in stiffness or elastic recoil from the middle of the board, and/or the front, middle, and rear of the board differ in stiffness or elastic recoil. As shown in FIG. 3e, individual superelastic components may be oriented on opposite sides of the ski 22, or board (24, 26, or 28), which further enables changing the stiffness and elastic recoil distribution. In addition or alternatively, the stiffness profile or elastic recoil characteristics may be distributed throughout individual superelastic components by changing the width or wall thickness, or cutting slots or other geometrical openings that increase flexibility throughout the superelastic component.

The superelastic components 18 also direct the motion of the skis 22 or boards (24, 26, or 28) depending on the activity. This is accomplished by tailoring the stiffness profile of the ski or board to the desired activity. For example, the superelastic components 18 may be fabricated and distributed to ensure that the ski 22 or board (24 or 26) remains in contact with the ground or other surface for the maximum amount of time. This is accomplished by tailoring the spring constant of the superelastic components 18 to dampen the impact of hitting bumps or other irregularities that flex the ski or board and otherwise would cause the ski or board to bounce away from the ground or other surface. Maximizing contact between the ski or board and the ground or other surface improves control and mobility of the ski or board by ensuring that the motion imparted by the user is transmitted to the ground or other surface.

Another improvement in the performance of skis or boards is to enhance the ability to control the slalom or turning. As the user begins to lean, one side of the skis or board flexes into a curve aiding the user in slaloming or turning. The amount of flexion the ski or board allows, and the resulting curvature, depends on the stiffness profile of the skis or board. Therefore, creating a flexible mid-section enables producing more curvature in the skis or board in response to a flexion, thereby producing a tighter turning radius and more control of such motion by the user. The tensile strength and the flex characteristics of the superelastic components enable generating tighter radii of curvature with the skis or board without plastically deforming or causing a failure of the device.

Figure 3G:
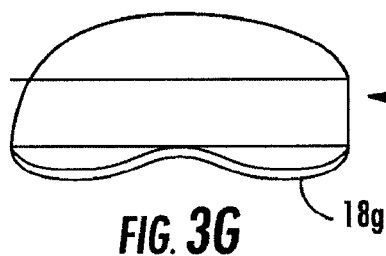
FIGS. 3g-3o are various view of skis having superelastic guides and runners to assist in turning and maneuvering.

Referring specifically to FIG. 3g, the ski 22 may include a superelastic component 18g in the form of a dual runner. Each runner extends from a central mounting region and has a curvature away from the ski. As a skier turns, one of the superelastic runners will flatten out, giving more surface area for that part of the ski during the turn. By tailoring the stiffness and flexibility, the runners can be configured to return to their curvature after the turn when the skier is going straight. The component 18g may be removably mounted to the ski. For example, the upper surface of the component 18g may have one or more mounting portion that are used to mount the component to the ski, using, for example, a bolt, binder, or other mounting means.

A ski boot or other type of boot can incorporate a superelastic component that is used to tailor the flexibility of the boot. The superelastic component, can be, for example, an L-shaped insert that is removably placed in the back of the boot and the bottom of the boot. The insert can be removed and replaced with an insert of a different stiffness if desired. The insert provides flexibility and may be annealed to restrict movement beyond set limits.

Figure 3H:
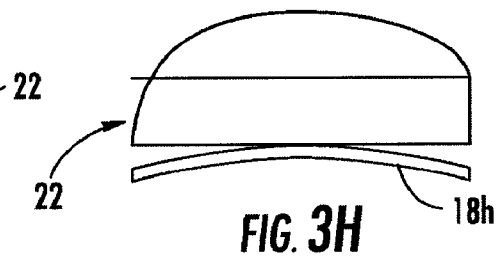

Referring to FIG. 3h, the ski 22 may include a superelastic component 18h in the form of a single runner that has a concave orientation with respect to the surface on which it rides. The component 18h has a pair of outer edges that can flex or extend in the direction toward the ski. Thus, when turning, the edge on the radius of the turn would be forced toward the ski, giving more area for the turn. The opposite edge could be configured to ride along the skiing surface or be of a curvature such that it is above the surface during sharp turns and/or close to the surface during gentle turns. The superelastic component 18h may be mounted in a manner similar to that of component 18g, above.

Figure 3I:
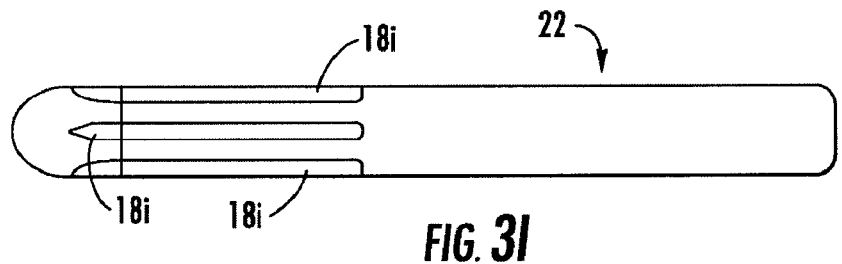
Figure 3J:
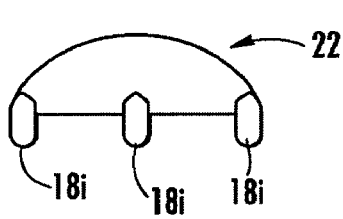
Figure 3K:
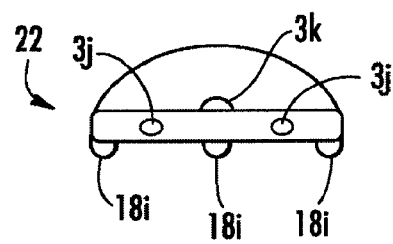

Referring to FIGS. 3i-3k, the ski 22 may include one or more superelastic components 18i that function as guides. The superelastic guides 18i may be configured to provide flexion of a part of the ski, such as the front of the ski. The front of the ski can be made thinner and more flexible and the superelastic guides 18i function to reinforce the front of the ski. In this manner, the front of the ski will absorb shock and dampen vibrations. Although illustrated in FIGS. 3i-3k as being on the lower surface of the ski 22, the guides can be configured to be one or more rods 3j within the interior of the ski or one or more rods 3k on the upper surface of the ski. The guides 18i also can be configured to be parallel, as shown, or to radiate away from a central point, in a manner similar to fingers from a hand.

Figure 3L:
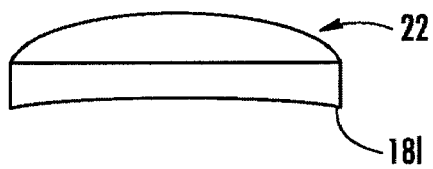

Referring to FIG. 3l, the ski 22 can be configured entirely or partially of a superelastic metal and have flexible edges 18i that extend down and/or outwardly from the ski to provide an edge surface for turning. The center of the ski will be flexible and tend to flatten out when a skier is using the ski 22. The ski 22 will advantageously dampen vibrations and absorb shock. Moreover, the stiffness and flexibility of the ski can be tailored with the superelastic metal to provide optimal skiing characteristics.

Figure 3O:
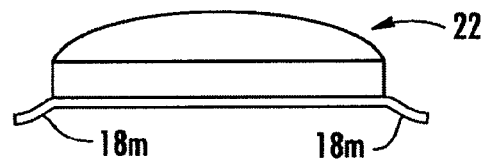
Figure 3M:
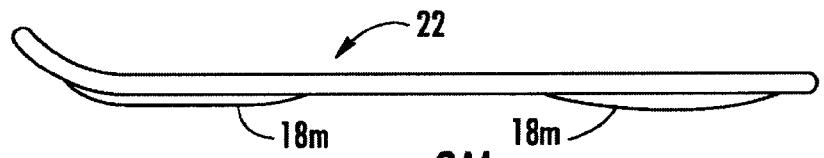
Figure 3N:
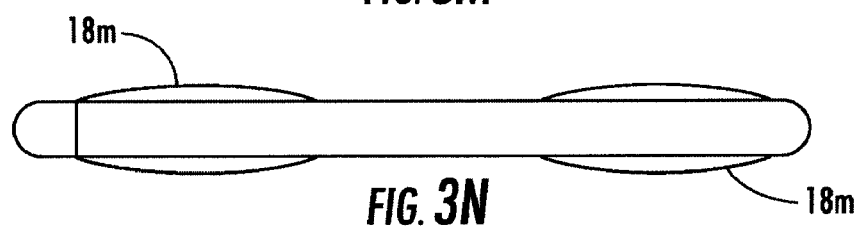

Referring to FIGS. 3m-3o, the ski 22 can be configured to have flexible edges 18m that flatten out when force is applied to them, such as when, for example, the skier is turning. The edges 18m can be continuous along the length of the ski, positioned at the front and/or rear of the ski but not in the middle section, or only in the middle section of the ski. The edges 18m can be separated mounted or can be parts of a base that is mounted to the ski.

Figure 3P:
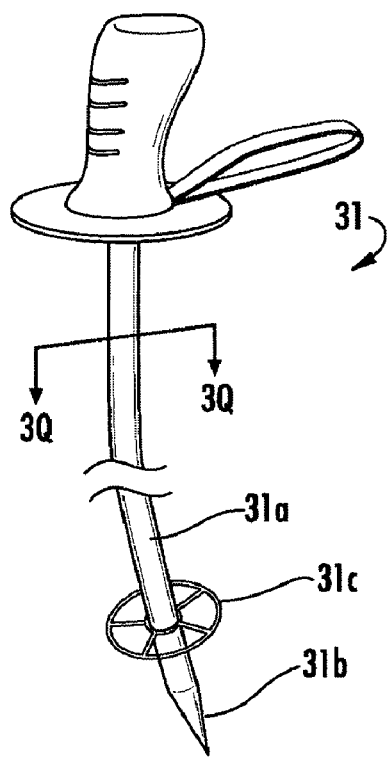
FIG. 3p is a front view of a ski pole using superelastic components.
Figure 3Q:
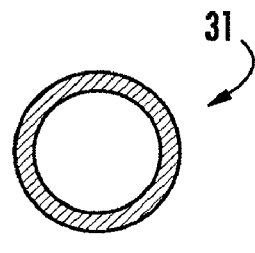
FIGS. 3q and 3r are cross-sectional views of the rod section of the ski pole of FIG. 3p.
Figure 3R:
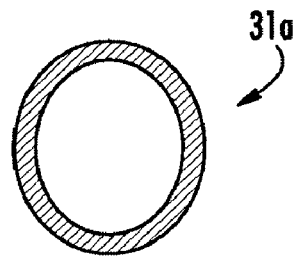
Figure 3S:
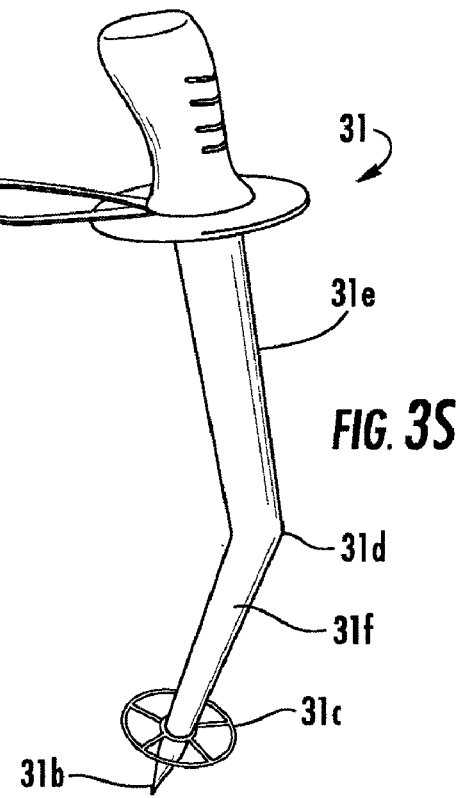
FIG. 3s is a front view of an angled ski pole using superelastic components.

The bindings or binding attachment mechanisms and/or accessories for the skis or boards above may also incorporate superelastic components or be fabricated from superelastic materials. For example, referring to FIGS. 3p-3r, a ski pole 31 can be fabricated entirely or in part from superelastic metals. Components that can be made from a superelastic metal include the rod 31a, the spike 31b, and the ring 31c. Because the superelastic metal can be made to be strong, it can have a hollow cross-section, as illustrated in FIGS. 3q and 3r. As illustrated in FIG. 3r, the cross-sectional shape of the rod 31a can be oval shaped, although any shape can be used. By fabricated parts or all of the ski pole 31 from superelastic metals, the pole will flex but not plastically deform, which ruins conventional ski poles. Moreover, the superelastic metal absorbs shocks and dampens vibrations, in particular from using the pole on icy snow. Referring also to FIG. 3s, the ski pole 31 can be fabricated from superelastic metal and have an angled connection 31d formed between an upper portion 31e and a lower portion 31f of the ski pole. The angled connection 31d will flex and provide a spring force when slightly released. The angled connection 31d also will absorb shock and dampen vibrations. These features will be advantageous in icy snow because they will also increase the likelihood that the spike 31b will grab or catch the ice and then sink into the ice to provide firm maneuvering.

Figure 4A:
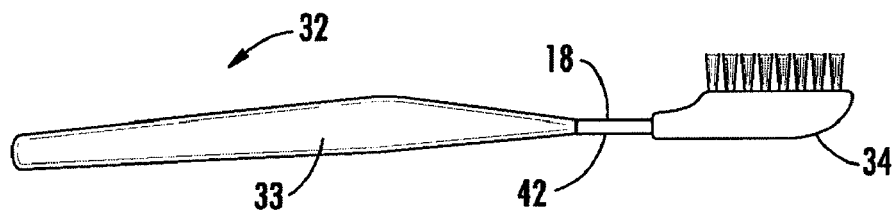
FIGS. 4a and 4b are a side view and a bottom view, respectively, of a toothbrush that contains superelastic components.
Figure 4B:
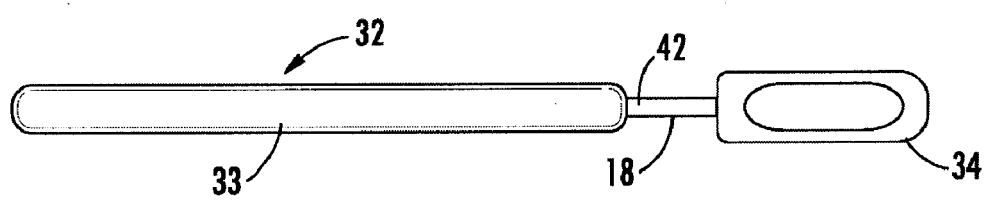

FIGS. 4a and 4b show a toothbrush 32 that contains a superelastic component 18 at the flex point 42 between the head 34 of the toothbrush 32 and the shaft 33. This flex point ensures the head 34 of the toothbrush, thus the bristles of the toothbrush remains in intimate contact with the teeth while brushing and applies the desired amount of force against the teeth. The use of superelastic materials in this capacity ensures the toothbrush retains the desired amount of spring force between the head 34 and the teeth, and that the flex point 42 does not plastically deform in response to frequent and multiple flexions. The stiffness of the flex point may be tailored to the desired force response by optimizing the cross-sectional geometry, the width, and the wall thickness of the superelastic component 18. The stiffness of the flex point may also prevent damage to the teeth and gums by deflecting above a predetermined force limit to ensure excess force is not applied against the teeth or gums with the toothbrush.

Figure 5A:
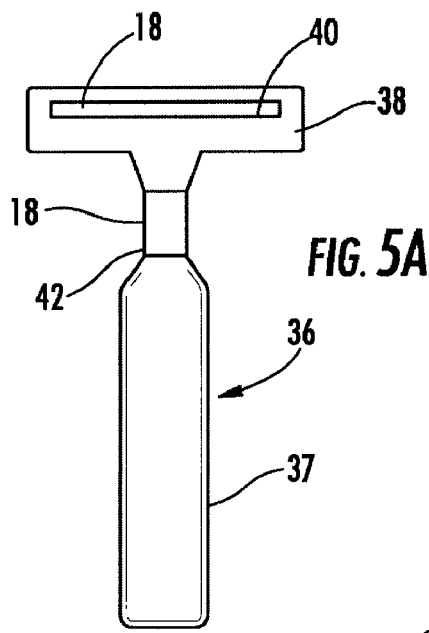
FIGS. 5a and 5b are a bottom view and a side view, respectively, of a razor that contains superelastic components.
Figure 5B:
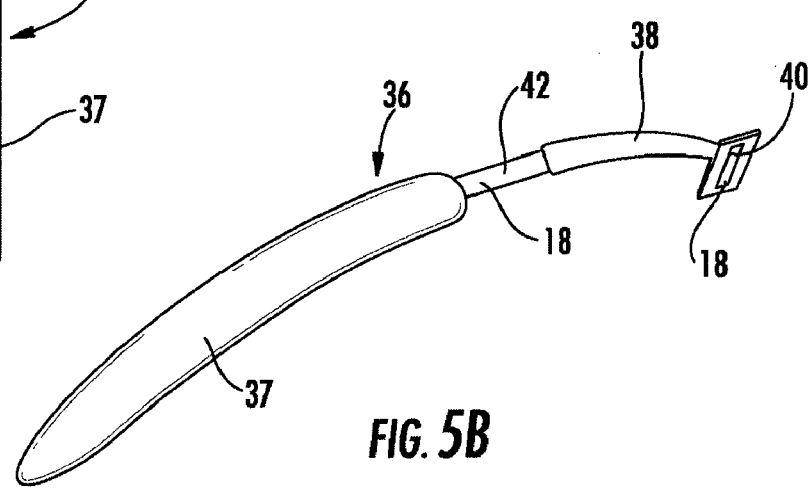

FIGS. 5a and 5b show a razor 36 that incorporates a superelastic component 18 at the flex point 42 between the head 38 of the razor and the handle 37. This flex point ensures that the head 38 of the razor, and thus the blade 40 of the razor, remains in intimate contact with the skin while shaving and applies the desired amount of force against the skin. The use of superelastic materials in this capacity ensures the razor retains the desired amount of spring force between the cutting head 38 and the skin, and that the flex point 42 does not plastically deform in response to frequent and multiple flexions. The stiffness of the flex point may be tailored to the desired force response by optimizing the cross-sectional geometry, the width, and the wall thickness of the superelastic component 18. The superelastic component 18 flex point 42 may be tailored with the optimal spring constant to ensure the cutting head 38, thus the blade 40, remains in intimate contact with and at the optimal angle relative to the skin despite irregularities in the contours of the face, or other body region.

Figure 6C:
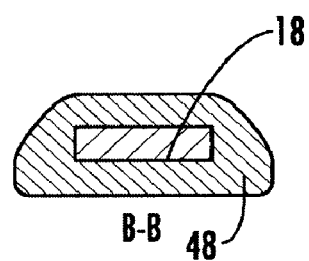
Figure 6B:
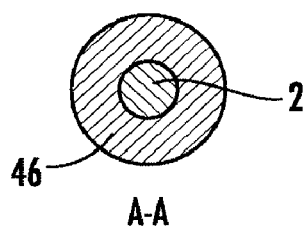
Figure 6A:
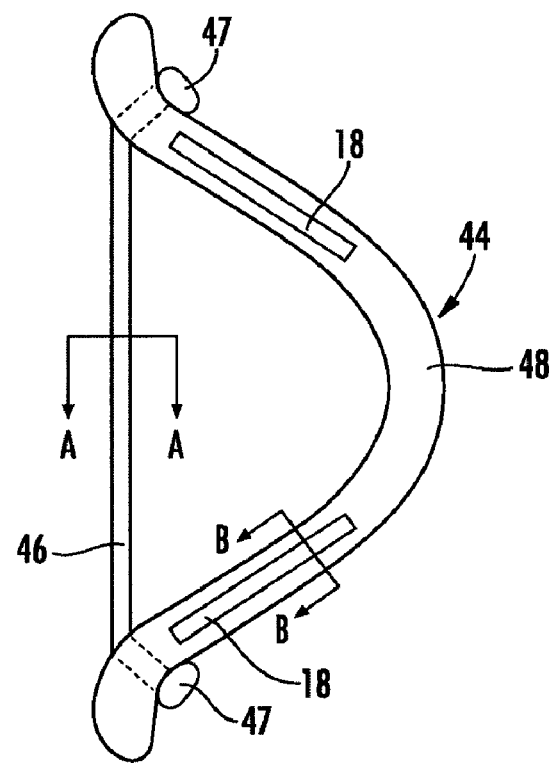
FIG. 6a is a side view of an archery bow that contains superelastic components.

FIGS. 6a to 6c show an archery bow 44 that incorporates superelastic components 2 or 18. The archery bow frame 48 contains at least one superelastic component 18 configured to permit flexing in response to an external force, mainly pulling on the string 46, thereby causing the frame to deflect into a tighter radius of curvature, and return towards their preformed shape once the external force is reduced or removed. The superelastic components 18 may be contained within a housing of the archery bow frame 48, as shown in FIG. 6c, or fabricated as the housing of the archery bow 44. The stiffness and spring force distribution of the at least one superelastic component may be tailored to the desired spring force by tapering the width, wall thickness, or otherwise changing the cross-section throughout the length of the at least one superelastic component. The string 46 of the archery bow 44 may also incorporate a superelastic component 2 as a central core or the string itself. The string 46 is attached to the archery bow frame 48 with rivets 47 or other attachment means configured to anchor the ends of the string 46 to opposite ends of the archery bow frame 48.

Figure 7A:
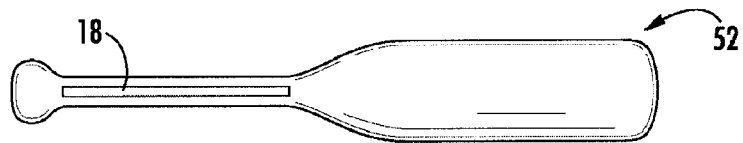
FIG. 7a is a side-sectional view of a boat oar that contains superelastic components.
Figure 7B:
FIG. 7b is a side-sectional view of a baseball bat that contains superelastic components.
Figures 7C, 8A, 8B:
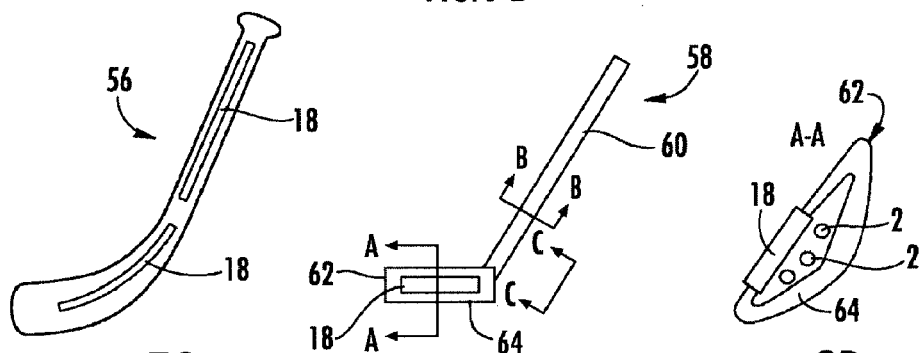

Superelastic components 18 may be used in the shafts of other athletic equipment to improve the spring response of the shaft upon deflection. FIG. 7a shows a boat oar 52 or canoe paddle that incorporates at least one superelastic component 18 in the shaft. FIG. 7b shows a baseball bat 54 containing at least one superelastic component 18 in the shaft. This superelastic component may alternatively be fabricated to produce a dampening response as discussed for the racket above. Alternatively, the baseball bat may contain a dense fluid or moveable solid inside a channel to increase the inertia at impact as discussed with the racket above. The baseball bat can include internal or external channels to contain the fluid or solid. FIG. 7c shows a hockey stick that incorporates at least one superelastic component 18 in the shaft and at least one superelastic component 18 in the flex point between the head and the shaft. These athletic devices are intended to exert a force against an object (e.g., water, a ball, a puck, etc.). By incorporating superelastic components 18 in the shafts of such devices, the maximum force exerted upon the object is increased. Flexion of such devices while swinging or other motion induces an elastic recoil that increases the force exerted upon the object. Similarly, superelastic components may be incorporated in fishing poles, vaulting poles, boat masts, or other device that produces a spring force in response to a deflection.

Figure 8G:
FIGS. 8e to 8g are side views of the golf club shaft of FIG. 8a taken along section line C—C.
Figures 8C, 8D:
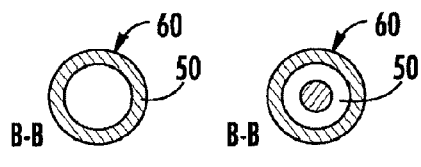

FIGS. 8a to 8g show a golf club 58 fabricated with superelastic components 2 and 18 intended to enhance the performance of the golf club. FIG. 8a shows a golf club that incorporates at least one superelastic component 2 or 18 in the shaft 60 and at least one superelastic component 2 or 18 in the flex point between the head 62 and the shaft 60. FIGS. 8c and 8d show a shaft 60 fabricated from a superelastic material and a shaft 60 that incorporates an inner superelastic component 50. Golf clubs are intended to exert a force against a ball to propel the golf ball a desired distance. By incorporating superelastic components 2 or 18 in the shafts 60 of golf clubs, the force exerted upon the object may be tailored to the specific golf club purpose. For example, a driver requires the maximum force applied to a golf ball and the force required progressively decreases in known increments as the golf club type changes from the lower irons to the wedges. Flexion of golf clubs that incorporate superelastic components 2 or 18 in the shafts or region between the head and shaft while swinging or other motion induces an elastic recoil that determines the force exerted upon the object. This spring force may be specified by the cross-sectional geometry, width, and wall thickness of the superelastic components.

Figure 8E:
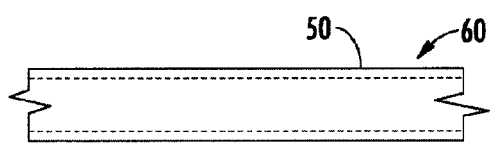
Figure 8F:
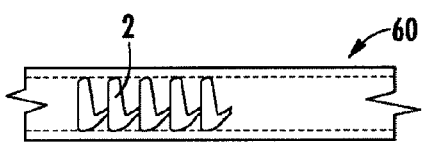

The region between the head 62 and the shaft 60 of the golf club may be configured as a flex point depending on the configuration of the superelastic components in this region. As shown in FIGS. 8e to 8g, the flex point may be fabricated from a superelastic material having the desired diameter and wall thickness profile throughout the length, with a superelastic component 2 wound in a coil or otherwise fabricated with a torque characteristic and inserted inside the shaft 60, or with the shaft 60 of the golf club fabricated from a superelastic material wound in a helical coil, or cut in a helical or other pattern. Such flex points are designed to increase the force exerted by the golf club on the ball by inducing an elastic recoil in response to a swinging motion that produces bending and/or rotation of the head at the flex point. In addition, such flex points may be tailored to incorporate a dampening effect by matching the resonance frequency of vibrations resulting from hitting a ball with the club head.

As shown in FIG. 8b, the head 62 may incorporate a superelastic component 18 along the contact surface of the head. The head may contain superelastic components 2 coiled or otherwise formed as spring mechanisms and attached to the club head 62 housing 64 between the contact surface of the head and the opposite surface. These superelastic components 2 provide the desired spring characteristic depending on the club type to ensure a consistent distance is obtained when hitting a ball with such golf clubs and correct for mis-hits. The stiffness and elastic recoil profile may be distributed throughout the club head 62 to better ensure consistency in hitting distance and direction by ensuring the same spring force is applied upon contact with the ball throughout the club head. The golf club can have an inner channel that, similarly to the racket describe above, can contain a dense fluid or moveable solid that can be used to increase the inertia during the swing. The golf club can include internal or external channels to contain the fluid or solid.

Superelastic components may also be incorporated in the core or internal liner of golf balls, baseball balls, or other balls by winding wires, flat sheets, or other raw material geometries fabricated from superelastic components into a ball and encompassing the superelastic components in a covering. The benefit of such a ball is its improved response to deflection.

Figure 9A:
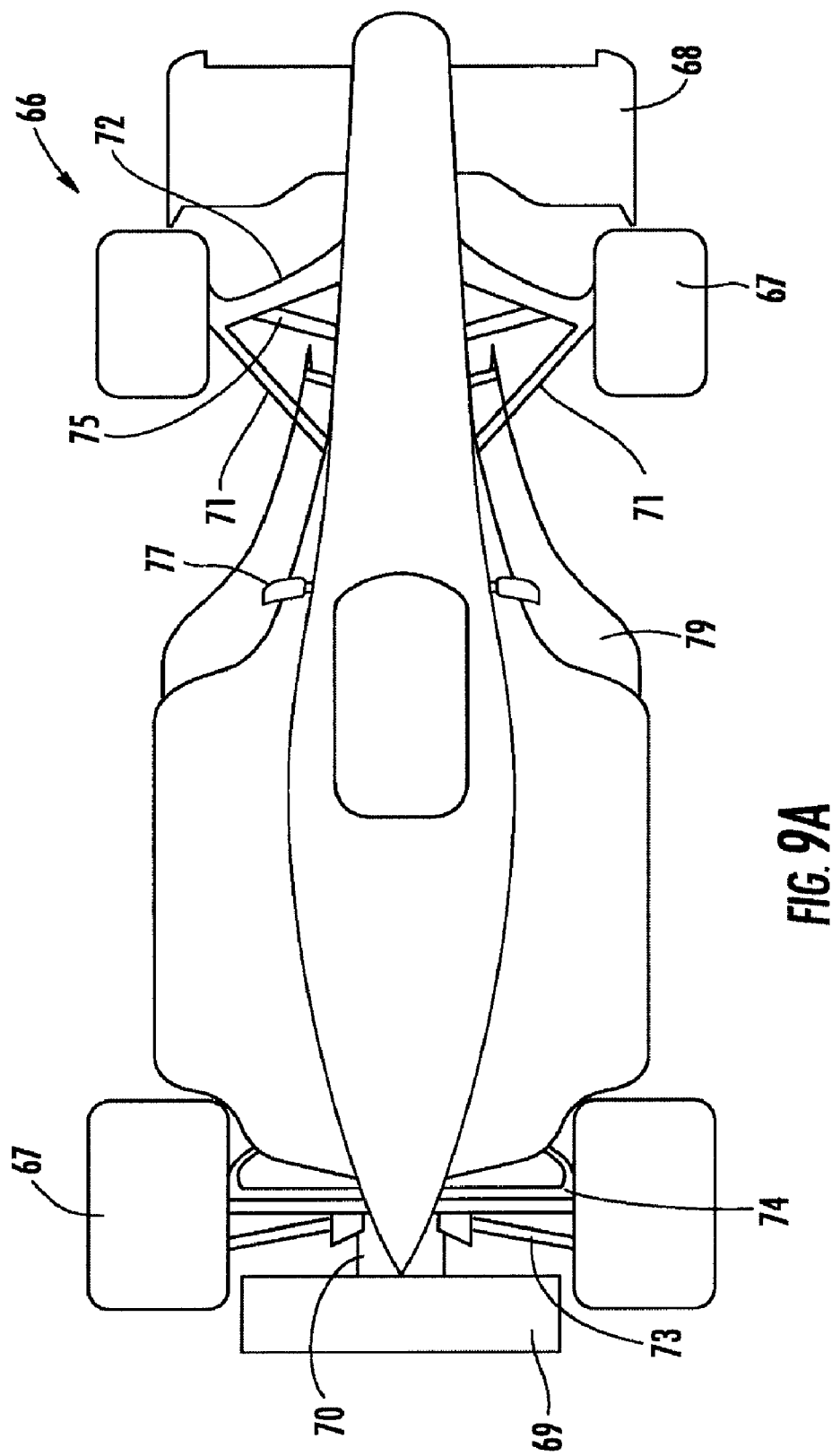
FIGS. 9a and 9b are a top view and a side view, respectively, of an automobile that contains superelastic components.
Figure 9B:
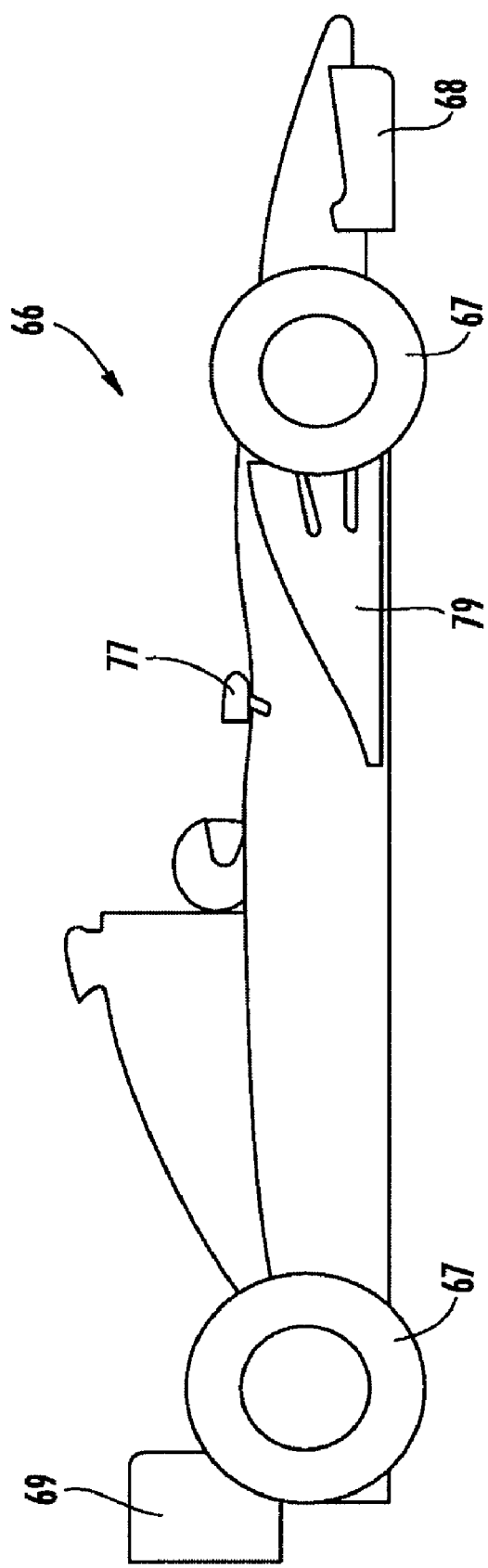

FIGS. 9a and 9b show a racing car that contains superelastic components in specific components configured to flex. It should be noted that such devices are not limited to racing cars but are applicable to numerous automobiles, motorcycles, or other motorized equipment. The car 66 in FIGS. 9a and 9b incorporates suspension components and aerodynamic components fabricated from superelastic materials or incorporating superelastic components. For example, car 66 contains two wishbone suspensions 71 and 72, two rear suspensions 73 and 74, a pushrod or other suspension, and/or shocks 78 (not shown). These suspensions 71, 72, 73, 74, 75, and 78 may be fabricated from superelastic materials or contain superelastic components within the component housing. As such, the superelastic suspension components bias the wheels 67 towards the ground or other surface by applying a desired spring force. This insures the wheel remains in contact with the ground or other surface continuously, and reduces the amount of time the wheels lose contact with the road or other surface.

The use of superelastic components in suspensions ensures contact between the wheels and the road when rolling over bumps or other irregularities in the road, when accelerating from a stop or on a wet road, when decelerating on a wet road, or when driving in icy conditions. The increased contact between the wheels and the road improves control of the car, especially when turning or driving along curves, increases velocity of the car, and decreases the time and distance to come to a complete stop.

Superelastic materials may also be used to improve the performance of aerodynamic components of the car. For example, the front wing 68, rear wing 69, other wings, sections of wings, the trailing edge of wings, wing connection links 70, or other aerodynamic aids may be fabricated from superelastic materials or incorporate superelastic components in the part. In this manner, as described in more detail below, the trailing edge of a wing or winglet may be deflected while the main portion of the wing remains undeflected to improve straight-line speed. Then, at a slower speed, for example, going around a corner, the trailing edge is undeflected or returns to its undeflected position to provide better down force.

Alternatively the attachment means of the front wing, rear wing, rear wing connection link, or other part may be fabricated from a superelastic component to tailor the flex point characteristics at the attachment location to the desired response. This helps maintain the stability of the aerodynamic parts when exposed to various forces. Incorporating a spring characteristic in the wings improves the response of the wings to ensure the wings return to its resting configuration when the external force causing the deflection is reduced. High performance cars or race cars require a significant amount of down force while going around curves; however, this down force hinders straight-line speed. As such superelastic components enable flexion of the wings into a less restrictive position at high speeds but quickly returns to the resting configuration which applies a downward force to enhance control at lower speeds, commonly associated with driving around curves. The spring characteristic of the superelastic components may be tailored to specify the transition between the high-speed orientation and the downward force position depending on the speeds the cars commonly see these conditions.

In addition, the barge boards 79 and/or the attachment means for the barge boards may be fabricated from superelastic materials or contain superelastic components. They also can be used to fabricate aerodynamic components that could be made, partially or completely, from superelastic materials and include, for example, the Gurney Strip, wicker bill, or Handford Device, end plates, diffusers, intake and exhaust areas, springs, winglets, etc. The flex points of the rear view mirrors 77 or the rear view mirrors themselves may also contain superelastic components to prevent plastic deformation when exposed to frequent deflections. Surface modifications could include oval, dimple, slot, hole, groove, combination or other indentations, protrusions or through holes, in a longitudinal, axial, cross, combination or other consistent or random pattern. The superelastic materials also can be used to modify cars, aircraft, and other aerodynamic surfaces to manipulate the airflow over these surfaces.

Cars also can use superelastic materials (including in sheet form) on the bodies of cars (especially high performance race cars) to improve projectile penetration resistance, because the material is light and strong. This application could significantly increase the protection of the driver's legs in cars such as Formula One and Indy cars. Superelastic/shape memory alloys and polymers also could be used in the sidewall, tread, and/or other areas or regions on automobile tires, motorcycle tires, bicycle tires, or other types of tires or wheels. The material could increase the strength (including limiting sidewall flex) and puncture resistance of the tire or wheel. The superelastic/shape memory material could be in the form of a sheet, band, wire (or wires), rod, braid, winding, laminate, combination of these, or any other similar configuration.

FIG. 10 shows a bicycle 76 fabricated with superelastic components. The superelastic components may be incorporated as frame inserts 84 designed to tailor the stiffness of the frame and withstand frequent flexions of the frame 82. The superelastic components may be incorporated as shocks 78 or springs to ensure intimate contact between the wheels of the bicycle and the road or other surface. The superelastic component may also be used as a shock 78 or spring connecting the bicycle seat to the frame 82. Superelastic components may also be used as spokes 80 in the wheels, or as the wheels themselves.

Figure 10A:
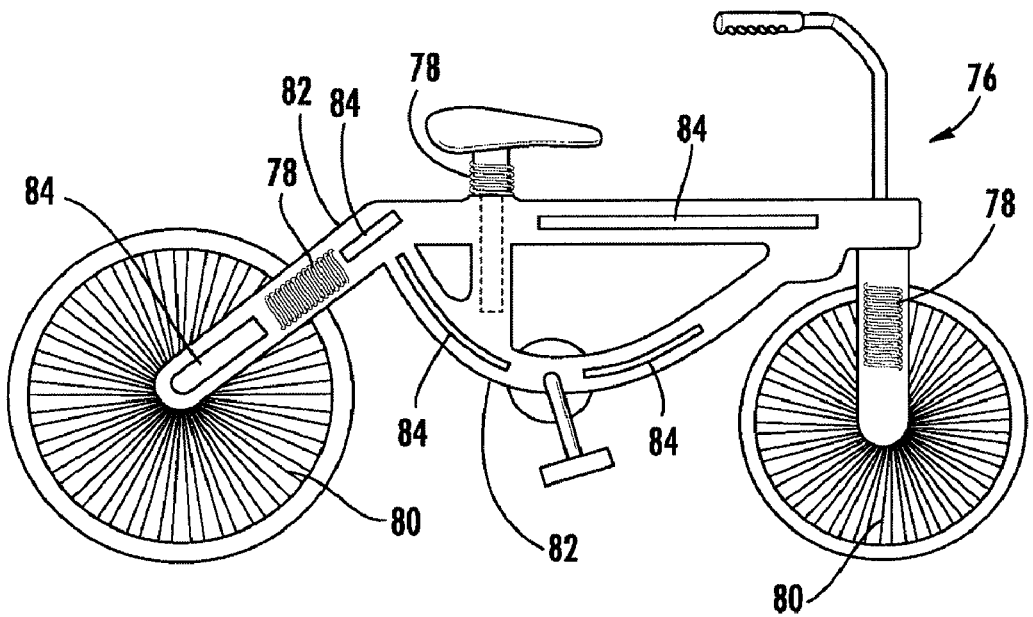
FIGS. 10a, 10b, 10c, and 10d is a side view of a bicycle that contains superelastic components.
Figure 10B:
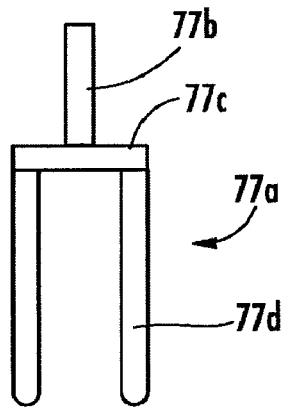

Referring to FIG. 10b, the front forks 77a beneficially can be made partially or entirely from a superelastic metal. The forks absorb shocks and vibrations while riding. Thus, fabricating the forks from a material that can absorb shocks and dampen vibrations will provide a smoother and more comfortable ride. The stem 77b and crown 77c may be made of a conventional alloy or a lightweight superelastic alloy. However, the individual forks 77d can provide the majority of shock absorbing and vibration dampening and are beneficially made from a lightweight superelastic alloy to improve the comfort of the ride.

Figure 10C:
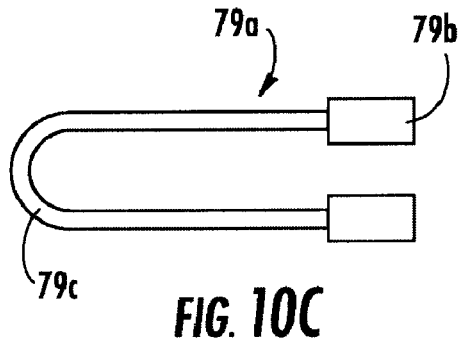
Figure 10D:
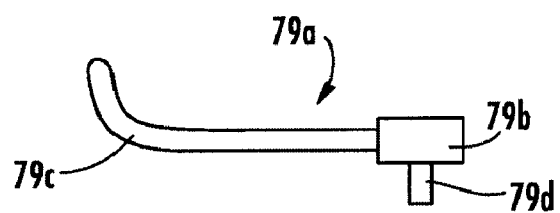

Referring to FIGS. 10c and 10d, an aerobar 79a can be made of a superelastic metal and/or a polymer and epoxy composite. An aerobar 79a includes an elbow rest 79b, an arm rest and hand grip 79c, and a mounting section 79d. By fabricating one or more of the elbow rest 79b, the arm rest and hand grip 79c, and the mounting section 79d from a superelastic metal, the superelastic component(s) of the aerobar will absorb shock and dampen vibrations, making the ride more comfortable for the rider. The entire arm rest and hand grip 79c, or a portion of it, can be made from a polymer, such as Kevlar, and epoxy composite for weight reduction and one or more of the remaining components of the aerobar may be made from a superelastic metal to provide beneficial shock absorbing and vibration dampening.

Figure 11:
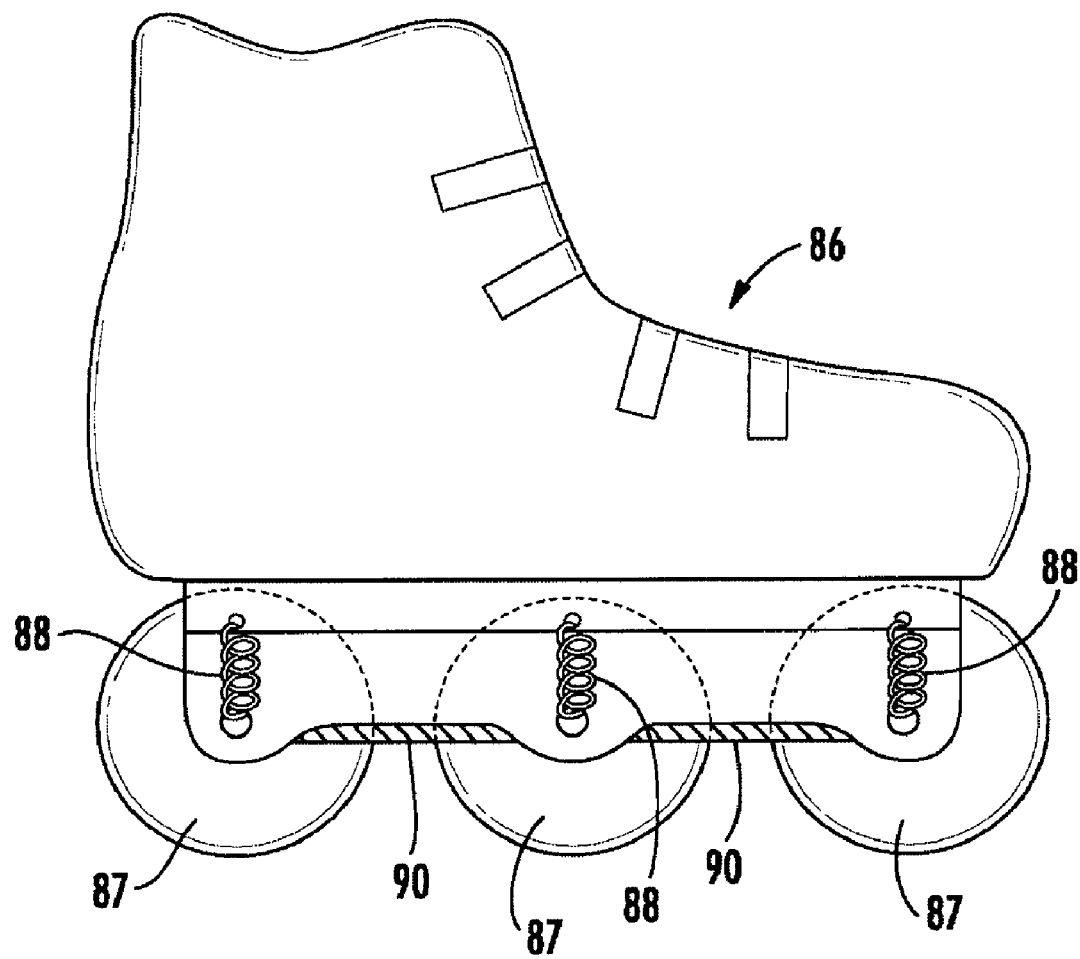
FIG. 11 is a side view of a roller blade, a roller skate, or an ice skate that contains superelastic components.

FIG. 11 shows a rollerblade 86 that incorporates superelastic components that connect the wheels 87 to the boot and interconnect the wheels. Shocks 88 or springs, and interconnects 90 fabricated from superelastic materials distribute the spring force along the boot to account for irregularities individual wheels 87 encounter, and maximize the contact between the wheels and the ground or other surface. Such superelastic shocks 88 and interconnects 90 may also be used in roller skates, skate boards, scooters, hockey skates, figure skates, or other athletic device intended to roll.

Alternatively, the component structures described above may be used in other athletic or other devices that inherently require flex points, shafts that flex upon swinging or other motion, or contact surfaces that determine the amount of force applied to an object. The ability to thermally shape the superelastic components to any form enables customizing the superelastic components to the athletic or other device. In addition, these component member structures may be used in athletic or other devices that require a continuous force to be exerted, or force biased in a predetermined direction.

Figure 12:
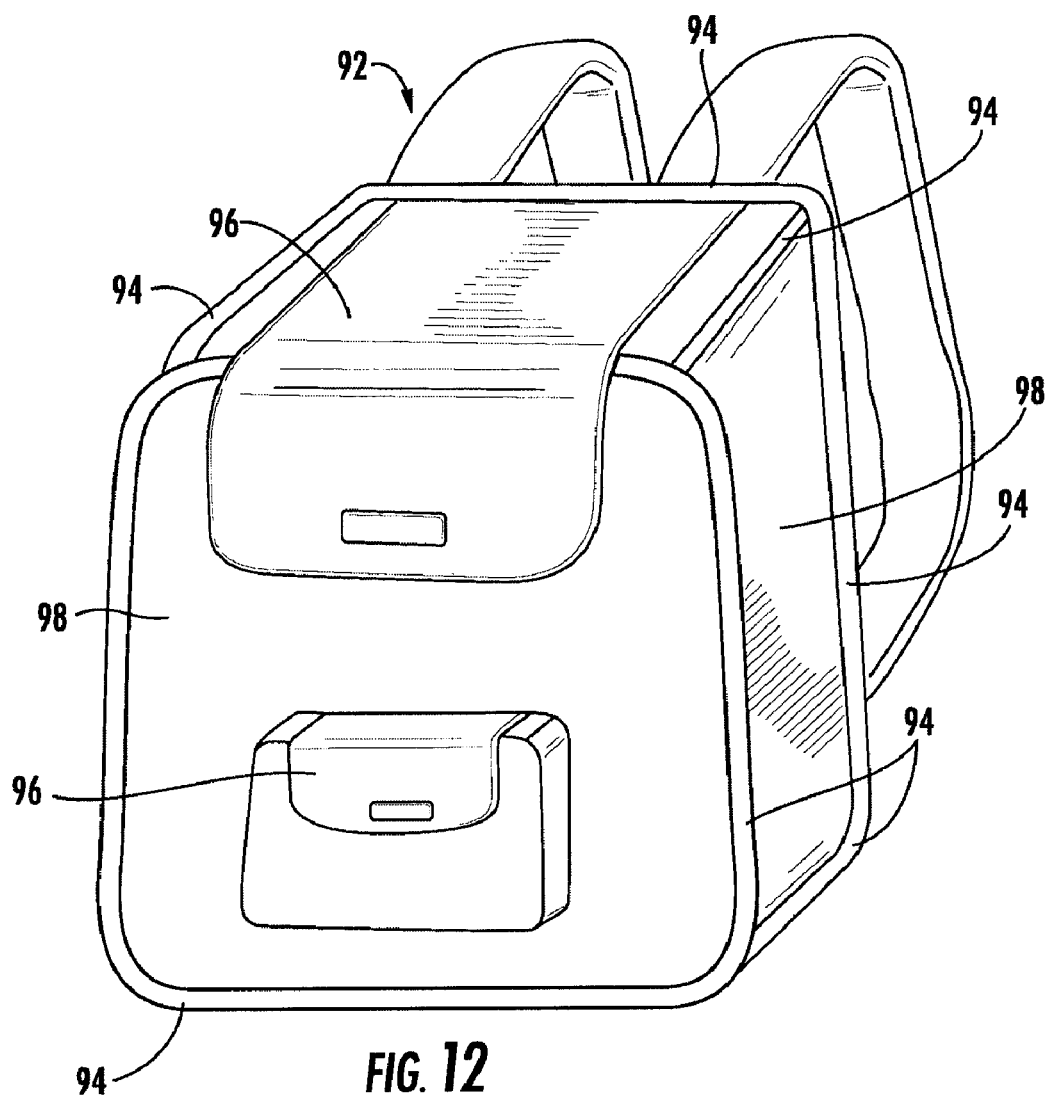
FIG. 12 is a perspective view of a backpack that contains superelastic components.

FIG. 12 shows a backpack 92 that contains superelastic components distributed throughout the frame 94. The superelastic components are encompassed in a covering 98 that defines the backpack 92. Pocket flaps 96 may also be formed in the backpack 92. Superelastic components enable flexion of the backpack in response to an external force and return of the backpack to its original shape when the external force is removed. The superelastic components are extremely light in weight yet provide substantial tensile strength. Similarly, superelastic components may be incorporated in the frame of kites, tents, or other such device.

Superelastic components may alternatively be incorporated in exercise equipment associated with applying a desired resistance in response to deflecting a member. In general, the superelastic component may provide a dynamic response to deflection that increase the resistance to bending with increased bending of the exercise equipment member that includes a deflectable superelastic component. For example, several exercise devices apply a resistance upon deflecting a beam, or a bow a desired distance. By fabricating the beam from superelastic materials or incorporating superelastic components in the beam, the resistance provided to the user may be better tailored to the optimal force vs. distance profile to improve the efficiency and effects of the exercise. The stress-induced martensite characteristics of superelastic materials enable varying the resistance in a predetermined profile or maintaining constant resistance over a substantially greater distance thereby producing any desired force response. Conventional exercise equipment exerts relatively constant resistance over a short distance and the resistance rapidly decreases past this point. Superelastic components also withstand numerous and frequent deflections without plastically deforming or failing thereby making them ideal for such exercise equipment.

The properties of the superelastic component members or structures described above may be varied to address applications in which the stiffness or elasticity needs to be varied accordingly. The composition of the superelastic material may be chosen to select the temperature range in which the component members or structures exhibit stress-induced martensite. As such, the amount of austenite, and stress-induced martensite characteristics throughout a specific temperature range may be chosen to specify the degree of deflection and amount of force exerted by the superelastic component member once deflected. For example, the superelastic properties of the material may be chosen so as exercise (or other activity) increases, the associated temperature increase induces a change in the superelastic properties of the superelastic component member or structure to provide, for example, increased rigidity and/or elasticity of the material.

Numerous modifications and/or additions to the above-described embodiments and implementations are readily apparent to one skilled in the art. It is intended that the scope of the present embodiments and implementations extend to all such modifications and/or additions and that the scope of the present embodiments and implementations is limited solely by the claims. For example, the techniques and principles described above can be applied to shoes by using a flat sheet or coil configuration such that the shoe has the ability to flex (slide) on itself. In addition, motion or deflection can be used to depress piezoelectric film, generating a voltage to heat an element on a shoe spring, and cause a phase shift in the defection characteristics. Such a system also can be adapted to be used as an internal heater for ski bases, ski boots, or other type boots used in cold weather, without the use of a DC or other power source.

They also can be applied to a support/spring for inclusion in nose strips to keep nostrils open to prevent or reduce snoring or as a sports device to improve or increase air flow into the lungs, especially during athletic activities, by keeping the nasal passages or nostrils open. The superelastic materials also can be sandwiched by or between many other materials such as fiberglass, carbon fiber, or other similar materials as a composite, or to provide a "living hinge" section between connected members. They also may be used as an umbrella frame and/or handle to increase the longevity of an umbrella by reducing the likelihood of damage to the umbrella. They also may be used in exercise equipment, such as resistive motion type equipment, for hand, elbow, knee, etc., exercises.

The superelastic metals can be applied as a strain relief for an electrical cable or wire or connectable tube at the end where the cable, wire, or tube is connected to a second component, such as an electrical extension cord, stereo jack, fluid tube, vacuum hose, pneumatic hose, air compressor, telephone recharger, etc. The strain relief can be on the inside, outside, or combination, of the cable, wire, hose, or tube. The superelastic/shape memory strain relief may be in the form of a coil, a mandril, tube, one or more rods, a wire, a wrap, a braided section, a hollow tube, or any combination of one or more of these forms. It also may be used with a shrink tube or injected molded strain relief. The strain relief can be added at the time of manufacture, during, for example, extrusion or injection molding, or later in the field or location of use. For example, it can be inserted into or around the end of the termination of the tube. The tube may have a separate channel to receive the strain relief.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A deflectable component for a motorized vehicle comprising:
    a deflectable part at least partially formed from a superelastic or shape memory material, wherein at least a portion of the deflectable part is moved to a deflected position upon application of a threshold force to the deflectable part when said motorized vehicle is moving at a predetermined speed, and wherein the deflectable part returns to an undeflected position upon reduction of the threshold force when said motorized vehicle is moving below the predetermined speed,
    wherein a spring characteristic of said superelastic or shape memory material is tailored to specify the transition between the deflected position and the undeflected position depending on the speed of the vehicle.

2. The component of claim 1 wherein the deflectable part returns to a resting undeflected configuration when external forces causing deflection of the deflectable part are removed.

3. A motorized vehicle air deflector for providing variable aerodynamic effects of the vehicle at different speeds, said deflector comprising:
    a connection link at least partially fabricated from a superelastic or shape memory material to tailor flex characteristics of the connection link to a desired response in order to effect a desired response of the motorized vehicle air deflector when exposed to changing external forces.

4. The deflector of claim 3 wherein the connection link enables flexion of the motorized vehicle air deflector into a desired position at higher speeds and returns to an undeflected or less deflected position at lower speeds.

5. A vehicle comprising:
    a deflectable part at least partially formed from a superelastic or shape memory material, wherein a portion of the deflectable part is configured to be positioned in a first position to generate a first amount of downforce when the vehicle is traveling above a selected speed, and wherein said portion is configured to be positioned in a second position to generate a second amount of downforce when the vehicle is traveling at or below the selected speed, wherein the second position generates a greater amount of downforce than the first position of the deflectable part to provide improved vehicle performance,
    wherein a spring characteristic of said superelastic or shape memory material is tailored to specify the transition between a deflected high-speed orientation and a higher downward force and less deflected position at a lower speed depending on the speed of the vehicle.

6. The vehicle of claim 5 further comprising a connection link to connect the deflectable part to the vehicle.

7. The deflectable component of claim 1, wherein said deflectable part comprises a surface having a trailing edge and a main portion.

8. The deflectable component of claim 7 wherein at least a portion of said trailing edge is configured to be deflected while said main portion of the surface remains undeflected, thereby improving straight-line speed.

9. The vehicle of claim 5, wherein said high-speed orientation is less aerodynamically restrictive than said downward force position.

10. The vehicle of claim 5, wherein said part comprises a trailing edge and a main portion.

11. The vehicle of claim 10, wherein said trailing edge is configured to be deflected while said main portion remains undeflected, thereby improving straight-line speed.

12. The vehicle of claim 6 wherein said connection link is at least partially formed of a superelastic or shape memory material.

13. The deflector of claim 3 further comprising a part attached to the connection link.

14. The deflector of claim 13 wherein said connection link is for attaching said part to a body of a motorized vehicle.

15. The deflector of claim 13, wherein said part comprises a trailing edge and a main portion.

16. The deflector of claim 15, wherein said trailing edge is configured to be deflected while the main portion of the part remains undeflected, thereby improving straight-line speed.

17. The deflector of claim 13, wherein said part is a deflectable part.

18. A vehicle, comprising:
    a deflectable part attached to said vehicle through a connection link, wherein said connection link is at least partially formed of a superelastic or shape memory material, wherein a portion of the deflectable part is configured to be positioned in a first position to generate a first amount of downforce when the vehicle is traveling above a selected speed, and wherein said portion is configured to be positioned in a second position to generate a second amount of downforce when the vehicle is traveling at or below the selected speed, wherein the second position generates a greater amount of downforce than the first position of the deflectable part to provide improved vehicle performance.

19. The vehicle of claim 18, wherein said deflectable part comprises a trailing edge and a main portion.

20. A method of improving performance of a motorized vehicle, said method comprising:
    providing a deflectable part at least partially formed from a superelastic or shape memory material;
    applying a threshold force to the deflectable part when said motorized vehicle is moving at a predetermined speed to move the deflectable part to a deflected position; and
    reducing force applied to the deflectable part when said motorized vehicle is moving below the predetermined speed to return the deflectable part to an undeflected position,
    wherein a spring characteristic of said superelastic or shape memory material is tailored to specify the transition between the deflected position and the undeflected position depending on the speed of the motorized vehicle.

21. The method of claim 20, wherein the deflectable part returns to a resting undeflected configuration when external forces causing deflection of the deflectable part are removed.

22. The method of claim 20, wherein the deflectable part comprises a surface having a trailing edge and a main portion.

23. The method of claim 22, wherein at least a portion of said trailing edge is configured to be deflected while said main portion of the surface remains undeflected, thereby improving straight-line speed.

24. A method for improving performance of a vehicle, said method comprising:

provving a motorized vehicle air deflector for providing variable aerodynamic effects of the vehicle at different speeds, said motorized vehicle air deflector comprising a connection link at least partially fabricated from a superelastic or shape memory material to tailor flex characteristics of the connection link to a desired response in order to effect a desired response of the motorized vehicle air deflector when exposed to changing external forces.

25. The method of claim 24, wherein the connection link enables flexion of the motorized vehicle air deflector into a desired position at higher speeds and returns to an undeflected or less deflected position at lower speeds.

26. The method of claim 24, further comprising providing a part attached to the connection link.

27. The method of claim 26, wherein said connection link is for attaching said part to a body of a motorized vehicle.

28. The method of claim 26, wherein said part comprises a trailing edge and a main portion.

29. The method of claim 28, wherein said trailing edge is configured to be deflected while the main portion of the part remains undeflected, thereby improving straight-line speed.

30. The method of claim 26, wherein said part is a deflectable part.

31. A method for improving performance of a vehicle, said method comprising:

providing a deflectable part at least partially formed from a superelastic or shape memory material;

positioning a portion of the deflectable part in a first position to generate a first amount of downforce when the vehicle is traveling above a selected speed; and positioning a portion of the deflectable part in a second position to generate a second amount of downforce when the vehicle is traveling at or below the selected speed, wherein the second position generates a greater amount of downforce than the first position of the deflectable part to provide improved vehicle performance, wherein a spring characteristic of said superelastic or shape memory material is tailored to specify the transition between a deflected high-speed orientation and a higher downward force and less deflected position at a lower speed depending on the speed of the vehicle.

32. The method of claim 31, further comprising connecting the deflectable part to the vehcible with a connection link.

33. The method of claim 32, wherein said connection link is at least partially formed of a superelastic or shape memory material.

34. The method of claim 31, wherein said high-speed orientation is less aerodynamically restrictive than said downward force position.

35. The method of claim 31, wherein said part comprises a trailing edge and a main portion.

36. The method of claim 35, wherein said trailing edge is configured to be deflected while said main portion remains undeflected, thereby improving straight-line speed.

37. A method of improving performance of a vehicle, said method comprising:

attaching a deflectable part to said vehicle through a connection link, wherein said connection link is at least partially formed of a superelastic or shape memory material;

positioning a portion of the deflectable part in a first position to generate a first amount of downforce when the vehicle is traveling above a selected speed; and positioning a portion of the deflected part in a second position to generate a second amount of downforce when the vehicle is traveling at or below the selected speed, wherein the second position generates a greater amount of downforce than the first position of the deflectable part to provide improved vehicle performance.

38. The method of claim 37, wherein said deflectable part comprises a trailing edge and a main portion.

* * * * *